United States Patent
Fukamizu et al.

(10) Patent No.: US 6,906,489 B2
(45) Date of Patent: Jun. 14, 2005

(54) STEPPING MOTOR DRIVE DEVICE AND METHOD

(75) Inventors: Shingo Fukamizu, Takatsuki (JP); Hiroki Matsunaga, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/793,342

(22) Filed: Mar. 5, 2004

(65) Prior Publication Data

US 2004/0232874 A1 Nov. 25, 2004

(30) Foreign Application Priority Data

Mar. 7, 2003 (JP) ........................................ 2003-062052

(51) Int. Cl.[7] .............................................. H02P 8/12
(52) U.S. Cl. ........................................ 318/685; 318/376
(58) Field of Search .............................. 318/685, 696, 318/375–381

(56) References Cited

U.S. PATENT DOCUMENTS

| | | | | |
|---|---|---|---|---|
| 4,095,154 A | * | 6/1978 | Williamson ................ | 318/376 |
| 5,578,911 A | * | 11/1996 | Carter et al. ................ | 318/376 |
| 5,838,127 A | * | 11/1998 | Young et al. ................ | 318/293 |
| 6,114,826 A | * | 9/2000 | Nishiura et al. ............ | 318/685 |
| 6,121,740 A | * | 9/2000 | Gale et al. .................. | 318/376 |
| 6,242,889 B1 | * | 6/2001 | Belyo ......................... | 320/128 |
| 6,838,853 B2 | * | 1/2005 | Matsunaga et al. ......... | 318/685 |

FOREIGN PATENT DOCUMENTS

JP  06-343295  12/1997

* cited by examiner

Primary Examiner—Bentsu Ro
(74) Attorney, Agent, or Firm—McDermott Will & Emery LLP

(57) ABSTRACT

A reference signal generation unit generates a reference signal VCA showing a current limit value with a staircase waveform. A PWM control unit compares a measurement signal SENA obtained by a coil current measurement unit with the reference signal VCA at intervals of a PWM timing signal generated by a PWM timing signal generation unit, and switches transistors of a bridge rectification circuit ON and OFF according to the comparison, thereby PWM controlling a supply current to a coil. A discharge instruction signal generation unit issues a discharge instruction signal MMCPA when the reference signal VCA decreases. In response, a PWM control unit forms a current path in the bridge rectification circuit to cause a regenerative current to flow back into a power supply and capacitor.

11 Claims, 21 Drawing Sheets

(PATH A)

(PATH B)

(PATH C)

(PATH D)

(PATH E)

(PATH F)

(PATH G)

(PATH H)

STEPPING MOTOR DRIVE DEVICE AND METHOD

This application is based on an application No. 2003-62052 filed in Japan, the content of which is hereby incorporated by reference.

BACKGROUND OF THE INVENTION (1) Field of the Invention

The present invention relates to a stepping motor drive device. More particularly, the present invention relates to a technique of driving a stepping motor with low noise, low vibration, and high efficiency.

(2) Description of the Related Art

Because of its suitable performance characteristic for positioning control, stepping motors have been conventionally used in photo graphing electronics devices, such as a DSC (Digital Still Camera or so-called "digital camera") and a DVC (Digital Video Camera) for adjustment of aperture, focus, zoom, and the like.

Stepping motors, especially those used in photographing electronics devices, are required to operate with low noise and low vibration. This is because sounds generated by a stepping motor are caught by a built-in microphone of a photographing electronics device and recorded as noise, and vibrations generated by a stepping motor cause unsteadiness of a photographing electronics device and result in degradation in picture quality.

In response to the above need, a technique of driving a stepping motor with low noise and low vibration is disclosed, for instance, in Japanese Patent Application Publication No. H06-343295.

FIG. 21 shows a drive device disclosed in the publication. (The following description focuses only on components that are necessary for explaining the principle of the device.)

In FIG. 21, the reference numeral 20 denotes a stepping motor that is driven by the drive device. The stepping motor 20 includes a rotor 45, a first coil 19a, and a second coil 19b.

An up-down counter 43a counts up or down a clock signal CLKP in accordance with an up-down signal DA, and outputs 4-bit signals DA1–DA4 representing the count to a D/A converter 44a.

The D/A converter 44a outputs a voltage signal VCA corresponding to the 4-bit signals DA1–DA4. The voltage signal VCA has a staircase waveform that rises and falls stepwise. The rapidity of change in level of the voltage signal VCA is variable depending on a frequency of the clock signal CLKP (a pulse frequency, to be more precise), as well as an amount of decrement or increment of the voltage signal VCA in each step. When the pulse frequency of clock signal CLKP is higher, as well as when the amount of decrement or increment of voltage signal VCA in each step is greater, the rate of change in level of the voltage signal VCA is greater. Further, by stopping the clock signal CLKP, the voltage signal VCA can be held at a fixed level.

A drive circuit 39a amplifies the voltage signal VCA by a non-inverting power amplifier 41a and also by an inverting power amplifier 42a. Thus, the first coil 19a connected between respective output terminals of the power amplifiers 41a and 42a is driven through the application of a voltage.

The same set of components as described above are provided for the second coil 19b too, to drive the second coil 19b through the application of a voltage based on a staircase waveform.

According to this construction, a voltage applied to a coil increases stepwise at the beginning of energization and decreases stepwise at the end of energization, so that abrupt torque fluctuations at the beginning and end of energization are reduced. Consequently, there is an effect of reducing vibration and noise that are generated by the torque fluctuations compared with the case where a voltage applied to a coil rises and falls in one stroke.

Unfortunately, however, the above conventional drive device is incapable of decreasing the coil current promptly enough upon the step-down of the staircase waveform, and thus the coil current fails to accurately follow the staircase waveform. Due to this insufficient accuracy, even if a voltage signal approximates a staircase waveform suitable for suppressing noise and vibration, e.g. a sinusoidal waveform, the coil current fails to closely follow the approximately sinusoidal staircase waveform. This gives a rise to a first problem that an intended effect of noise and vibration suppression is not achieved.

In addition, there is a second problem that the conventional drive device is power-consuming because the coil current is supplied at all times.

SUMMARY OF THE INVENTION

The present invention is made in view of the above problems, and has a first object to provide a drive device for driving a stepping motor with low noise and low vibration.

A second object of the present invention is to provide a drive device for driving a stepping motor with reduced power consumption.

In one aspect of the present invention, a stepping motor drive device includes a pulse-width modulation control unit operable to pulse-width modulate a supply current from a power supply circuit to a coil that is included in a stepping motor, according to a reference signal showing a current limit value; a discharge instruction signal output unit operable to output a discharge instruction signal when the current limit value decreases; and a discharge control unit operable to cause a regenerative current from the coil to flow back into the power supply circuit during a time the discharge instruction signal is outputted.

Here, the stepping motor drive device may further include a bridge rectification circuit that includes a plurality of switching units, and is operable to rectify a current through the coil. The discharge control unit causes the regenerative current from the coil to flow back into the power supply circuit by putting each of the switching units individually in a predetermined state that is one of a conducting state and a non-conducting state.

With the constructions stated above, when the current limit value decreases, a regenerative current from the coil is caused to flow back into the power supply circuit. As a result, energy in the coil current rapidly shifts to the power supply circuit, which accelerates decay of the regenerative current. Consequently, the coil current more accurately follows the current limit value being decreased.

Thus, when, for example, a reference signal that approximates a sinusoidal waveform is supplied aiming to effectively suppress noise and vibration, the coil current accurately follows the approximately sinusoidal staircase waveform. Consequently, an intended effect of noise and vibration suppression is sufficiently achieved.

In addition, since the stepping motor drive device pulse-width modulates the supply current to the coil, the power consumption is lower than in a conventional voltage control.

Here, the stepping motor drive device may further include a synchronous rectification control unit operable to cause the regenerative current from the coil to circulate around the bridge rectification circuit by putting at least two of the switching units into the conducting state so as to form a closed circuit with the coil.

With the construction stated above, the energy in the coil is maintained in the bridge rectification circuit, which improves power efficiency.

Here, the discharge instruction signal output unit may acquire a period-specifying signal that specifies a length of a discharge period, and output the discharge instruction signal for the specified discharge period starting when the current limit value decreases.

With the construction stated above, even when the reference signal decreases in non-uniform steps, the discharge instruction signal is outputted for a suitable duration by supplying an appropriate signal specifying a length of a period. To be more specific, the discharge instruction signal is outputted for a duration that is substantially equal to the time taken by the discharge current to approach the current limit value decreased in each step.

With such a discharge instruction signal, the discharge current decreases by an amount precisely corresponding to a decrement of the reference signal in each step, neither too much nor too little. Consequently, the discharge current follows the current limit value more accurately.

Here, the stepping motor drive device may further include a coil current measurement unit operable to measure the regenerative current from the coil flowing back into the power supply circuit; and a comparison unit operable to compare the measured regenerative current with the current limit value. The discharge instruction signal output unit may output the discharge instruction signal for a duration starting when the current limit value decreases until the measured regenerative current falls below the decreased current limit value.

Here, the stepping motor drive device may further include a resistor connected in series with the coil and the power supply circuit. The regenerative current from the coil flows back into the power supply circuit through the resistor. The coil current measurement unit may measure the regenerative current based on a voltage across the resistor.

With the construction stated above, the discharge instruction signal is outputted for a duration staring at the time when the current limit value shown by the reference signal decreases and until the measured discharge current falls below the current limit value having been decreased.

With such a discharge instruction signal, the discharge current decreases by an amount precisely corresponding to the decrease of the reference signal in each step, neither too much nor too little. Consequently, the discharge current follows the current limit value more accurately.

Here, the supply current from the power supply circuit to the coil, as well as the regenerative current, flows through the resistor. The coil current measurement unit may measure the supply current to the coil based on a voltage across the resistor. The pulse-width modulation control unit may compare the measured supply current with the current limit value, and pulse-width modulate the supply current according to the comparison.

With the construction stated above, one resistor measures both a supply current and a discharge current, which serves to simplify the circuitry.

Here, the stepping motor drive device may further include: a bridge rectification circuit that includes a plurality of switching units and is operable to rectify a current through the coil, one of the switching units that is put into the conducting state being a first semiconductor element that serves as the resistor; a reference current supply circuit operable to supplying a current at the current limit value; and a second semiconductor circuit that is connected in series with the reference current supply circuit and is in the conducting state. The comparison unit may compare a first voltage across the first semiconductor element with a second voltage across the second semiconductor voltage. The discharge instruction signal output unit may output the discharge instruction signal for a duration until the second voltage falls below the first voltage.

With the construction stated above, the coil current is measured using the voltage across a switching element constituting the bridge rectification circuit. This eliminates the need for serially connecting a dedicated resistor for measuring the coil current. Consequently, power efficiency is not impaired, and thus power consumption is reduced.

In addition, the first semiconductor element and the second element can be embodied by transistors of uniform property manufactured through the same diffusion process. This improves relative accuracy in measurement of the coil current.

Here, the stepping motor driving device may further include a digital signal reception unit operable to receive a digital signal showing the current limit value. The stepping motor drive device may acquire the reference signal by digital-to-analog converting the received digital signal.

With the construction stated above, the reference signal is generated according to a digital signal so as to approximate any desired waveform. Thus, it is made easy and convenient to generate a reference signal that approximates a waveform suitable for suppressing noise and vibration, such as a sinusoidal waveform.

Here, the stepping motor may include a plurality of coils which correspond one-to-one with a plurality of phases. The pulse-width modulation control unit may pulse-width modulate a supply current to each coil individually, according to a reference signal showing a current limit value for a corresponding coil. The discharge instruction output signal may output a discharge instruction signal for each coil of which a current limit value decreases. The discharge control signal may cause, for a duration of the discharge instruction signal, a regenerative current from a corresponding coil to flow back into the power supply circuit.

With the construction stated above, the stepping motor drive device performs the pulse-width modulation control on the supply current to each coil and also the discharge control on the regenerative current from each coil. Thus, each coil current more accurately follows the current limit value being decreased, so that the effect of suppressing noise and vibration as well as the effect of lowering power consumption are achieved.

In another aspect of the present invention, a stepping motor drive method including: a pulse-width modulation step of pulse-width modulating a supply current from a power supply circuit to a coil that is included in a stepping motor, according to a reference signal showing a current limit value; a discharge instruction signal output step of outputting a discharge instruction signal when the current limit value decreases; and a discharge control step of causing a regenerative current from the coil to flow back into the power supply circuit during a time the discharge instruction signal is outputted.

With the method stated above, a stepping motor is driven in a manner to achieve the effect of suppressing noise and vibration as well as the effect of lowering power consumption described above.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment 1

A stepping motor drive device consistent with an embodiment 1 of the present invention performs a PWM (Pulse Width Modulation) control on a current supplied from a power supply circuit to a coil included in a stepping motor. Here, the PWM control is performed according to a reference signal using a current chopping method. The reference signal has a staircase waveform with the level of each step representing a current limit value.

When the reference signal decreases, the stepping motor drive device outputs a discharge instruction signal for a predetermined duration. During the time the discharge instruction signal is being outputted, the stepping motor drive device operates so as to cause a regenerative current from the coil to flow back into the power supply circuit.

Hereinafter, description is given to the stepping motor drive device with reference to the drawings.

(Overall Construction)

Figure 1:
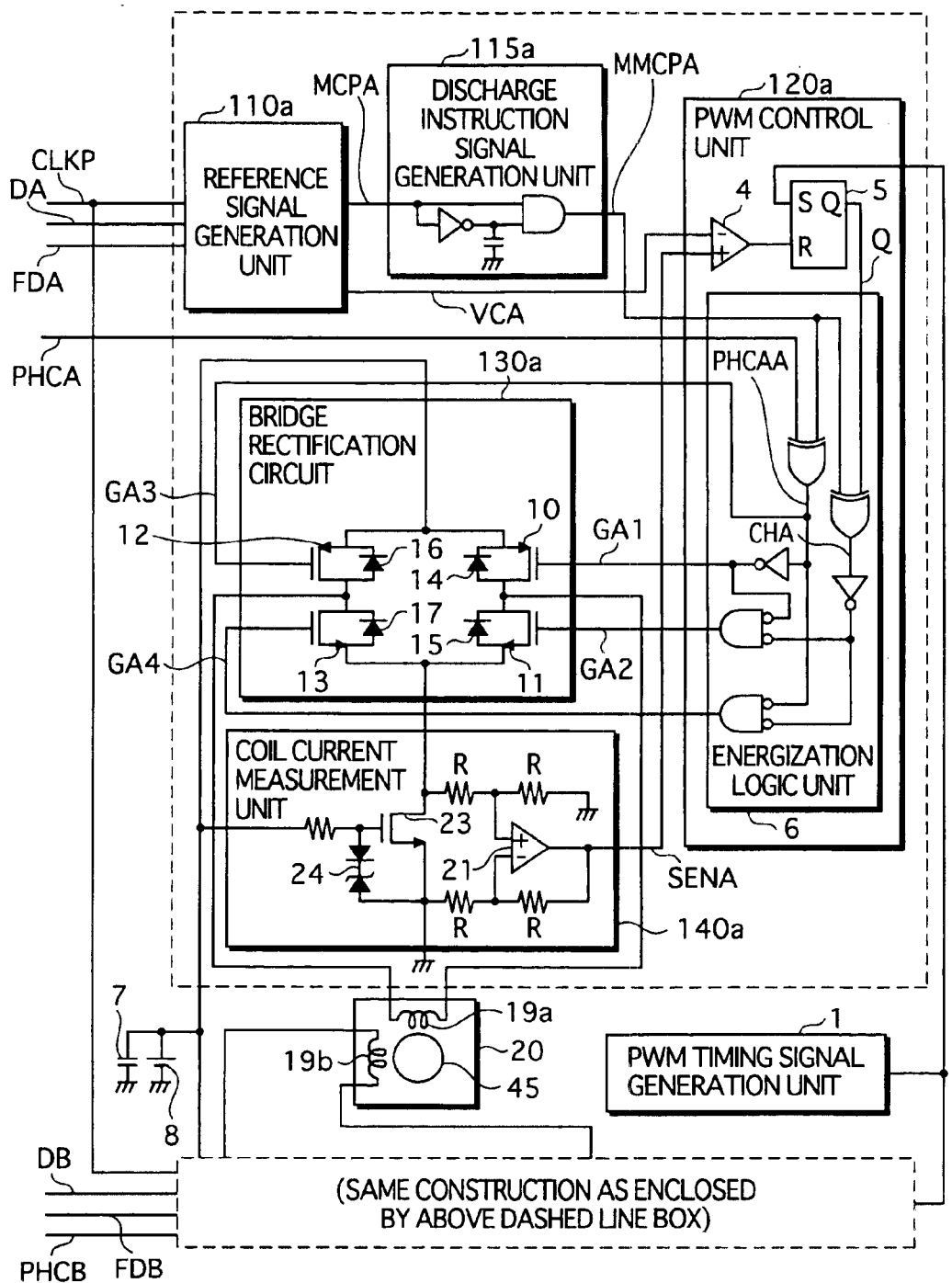
FIG. 1 is a functional block diagram showing a construction of a stepping motor drive device.

FIG. 1 is a functional block diagram showing an overall construction of the stepping motor drive device. The figure also shows a stepping motor that is driven by the stepping motor drive device.

As shown in FIG. 1, the stepping motor 20 includes the rotor 45, and the first coil 19a and the second coil 19b that correspond to different phases.

The stepping motor drive device includes a PWM timing signal generation unit 1, a reference signal generation unit 110a, a discharge instruction signal generation unit 115a, a PWM control unit 120a, a bridge rectification circuit 130a, a coil current measurement unit 140a, a power supply 8, and a DC coupling capacitor 7. The power supply 8 and the capacitor 7 are connected in parallel and together form a power supply circuit.

Since the same set of components is provided for each coil, description below is given only to the components provided for the first coil 19a.

The reference signal generation unit 110a outputs a reference signal VCA having a staircase waveform that rises and falls stepwise at a predetermined step frequency, according to a clock signal CLKP, an up-down signal DA, and a step-frequency designating signal FDA. In addition, the reference signal generation unit 110a outputs a trigger signal MCPA at a point of time when the reference signal VCA decreases.

The discharge instruction signal generation unit 115a outputs a discharge instruction signal MMCPA for a predetermined duration upon output of the trigger signal MCPA. The time constant of the discharge-instruction signal generation unit 115a is so determined that the discharge instruction signal MMCPA is outputted for a duration substantially equal to the time taken for the discharge current to approach one step decrease of the reference signal VCA.

The PWM control unit 120a includes an operational amplifier (hereinafter, referred to as "op-amp") 4, a flip-flop 5, and an energization logic unit 6.

The bridge rectification circuit 130a includes transistors 10–13 and flywheel diodes 14–17.

Specifically, the transistor 11 or 13 chops the supply current to the coil 19a in response to a gate signal GA2 or GA4 that is outputted from the energization logic unit 6 according to a polarity signal PHCA.

The transistors 10–13 form a current path according to the gate signals GA1–GA4 outputted from the energization logic unit 6. During the time the discharge instruction signal MMCPA is being outputted, the transistors 10–13 form a different current path from the one formed at the time of supplying a current, so as to cause a regenerative current from the coil 19a to flow back into the power supply circuit.

Hereinafter, the operation for causing the regenerative current to flow back into the power supply circuit may also be referred to as "discharge", and the regenerative current may also be referred to as a "discharge current".

The coil current measurement unit 140a includes an ON resistance adjustment circuit 24, a transistor 23, and an op-amp 21. The transistor 23 is adjusted by the ON resistance adjustment circuit 24 to have a predetermined ON resistance. The op-amp 21 outputs a measurement signal SENA representing the voltage that is generated across the transistor 23 proportionally to the discharge current.

(Details of Reference Signal Generation Unit 110a)

Figure 2:
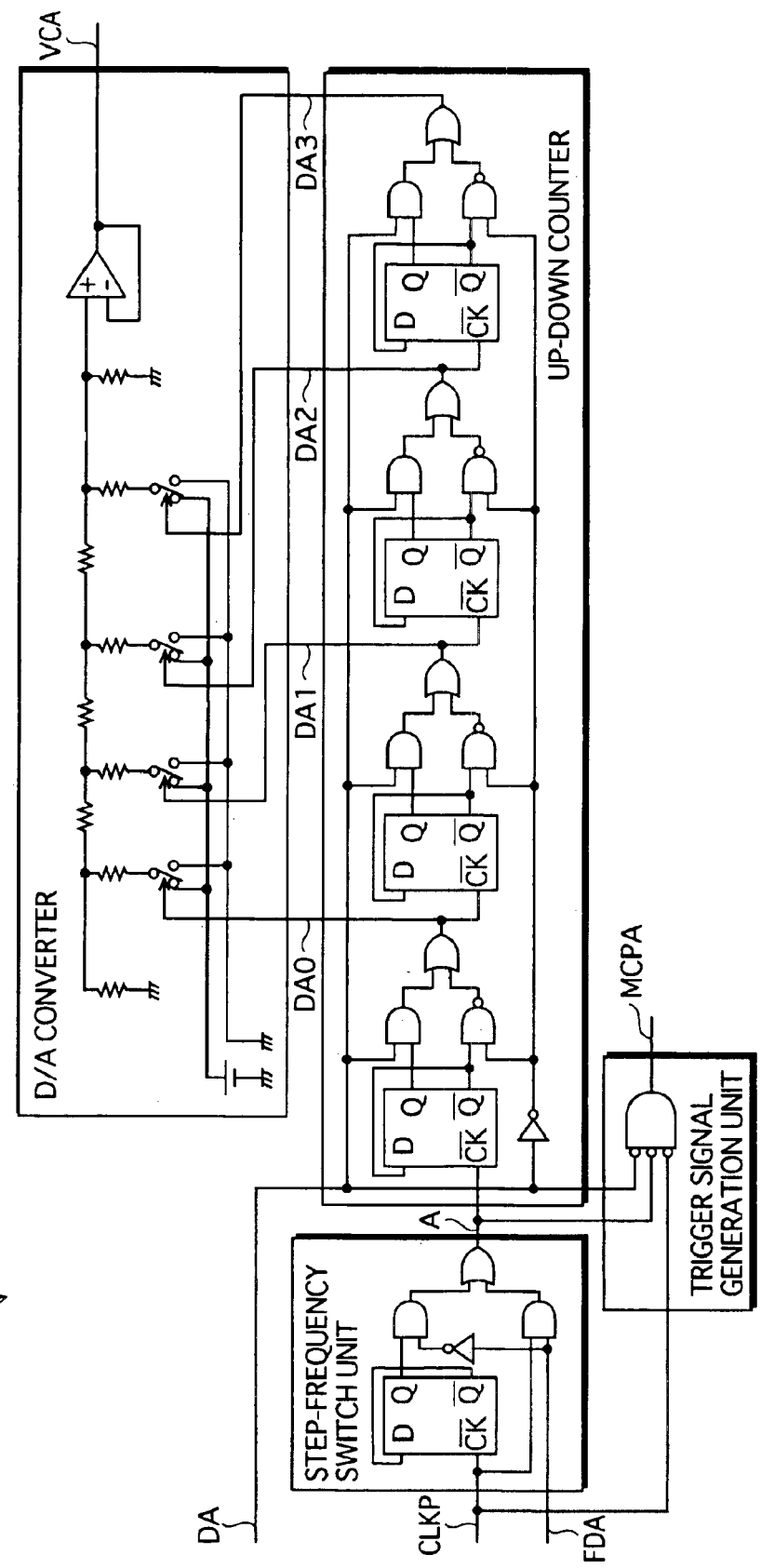
FIG. 2 is a functional block diagram showing a construction of a reference signal generation unit.

FIG. 2 is a functional block diagram showing a detailed construction of the reference signal generation unit 110a. A step-frequency switch unit selects either the clock signal CLKP or a signal obtained by dividing the clock signal CLKP by two, according to the step-frequency designating signal FDA. The selected signal is then outputted to an up-down counter as a step-frequency signal A.

The up-down counter counts up or down the step-frequency signal A according to the up-down signal DA. The up-down counter outputs 4-bit signals DA0–DA3 showing the count, to a D/A converter. The D/A converter converts the 4-bit signals DA0–DA3 to an analog voltage, and outputs the resulting analog voltage as the reference signal VCA. Since the up-down counter and the D/A converter are both well-known in the art, detailed description thereof is omitted here.

A trigger signal generation unit outputs a trigger signal MCPA at a high level during the time the clock signal CLKP, the up-down signal DA, and the step-frequency signal A are all at a low level. The rising edge of the trigger signal MCPA indicates a point of time when the reference signal VCA decreases.

Figure 3:
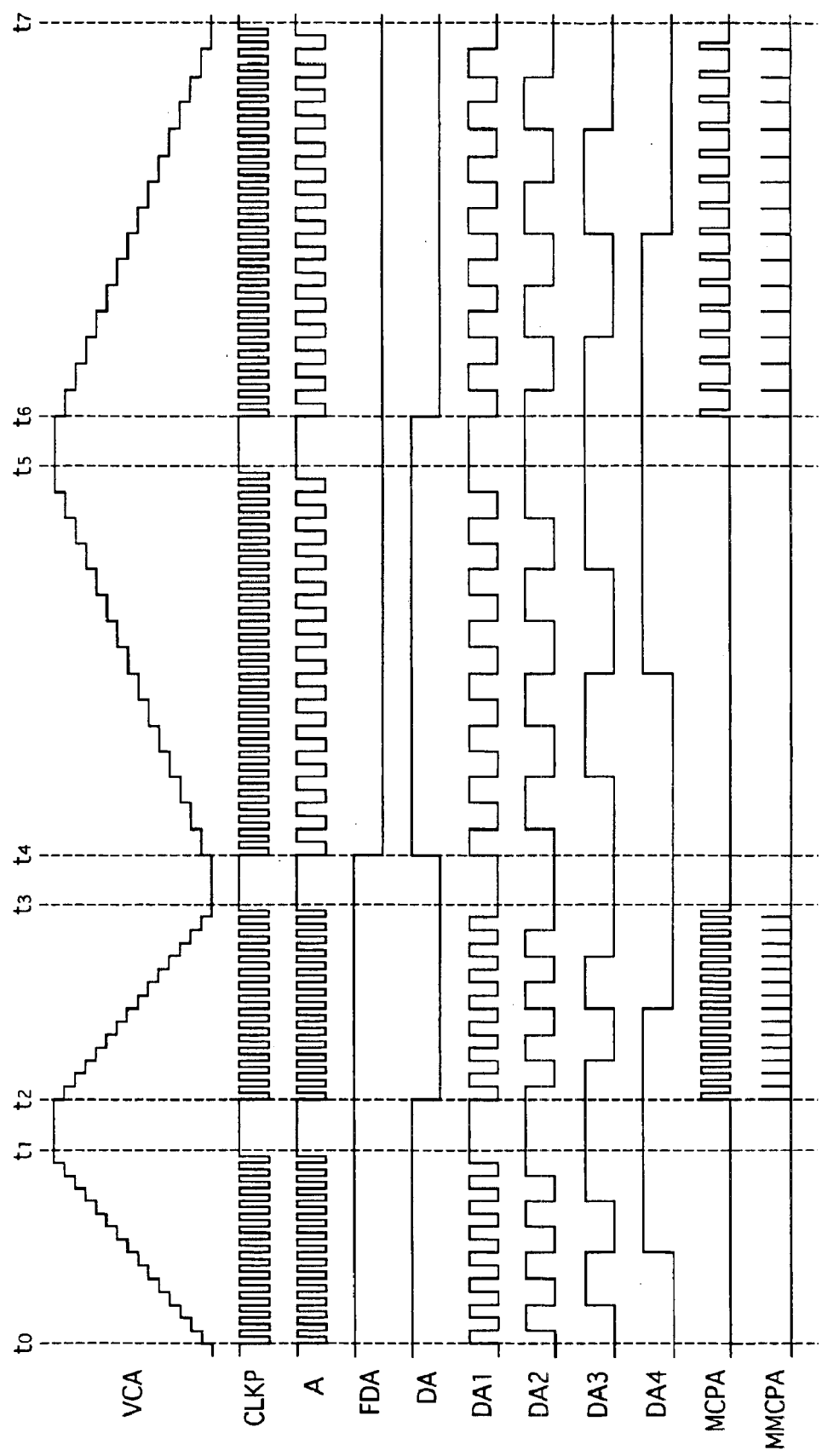
FIG. 3 is a timing chart showing main signals in the reference signal generation unit.

FIG. 3 is a timing chart showing main signals in the reference signal generation unit 110a. For convenience in description, a low level and a high level of a binary signal are denoted hereinafter as "0" and "1", respectively.

From time t0 to t1, the clock signal CLKP is issued together with the step-frequency designating signal FDA "1" and the up-down signal DA "1". In response, the up-down counter and the D/A converter generate the reference signal VCA having a staircase waveform that rises from the lowest level to the highest level with a high step frequency.

From t1 to t2, the clock signal CLKP is stopped, so that the reference signal VCA is maintained at the highest level.

From t2 to t3, the clock signal CLKP is issued together with the step-frequency designating signal FDA "1" and the up-down signal DA "0". In response, the up-down counter and the D/A converter generate the reference signal VCA having a staircase waveform that falls from the highest level to the lowest level with a high step frequency. During the time, the trigger signal generation unit outputs a trigger signal MCPA "1" each time the reference signal VCA falls by one step.

From t4 to t7, the step-frequency designating signal FDA "0" is issued. In response, the reference signal VCA having a staircase waveform that rises and falls at a low step frequency is generated. Specifically, during the time from t6 to t7, the trigger signal generation unit outputs the trigger signal MCPA "1" each time the reference signal VCA falls by one step.

The discharge instruction signal generation unit 115a outputs the discharge instruction signal MMCPA "1" for the predetermined duration mentioned above, starting concurrently with the rising edge of the trigger signal MCPA.

(Details of Coil Current Control)

Next, description is given in detail to a coil current control operation that is performed cooperatively by the discharge instruction signal generation unit 115a, the PWM control unit 120a, the bridge rectification circuit 130a, and the coil current measurement unit 140a. The control operation described herein includes a PWM control operation of the supply current as well as the discharge operation of the regenerative current.

Figure 4:
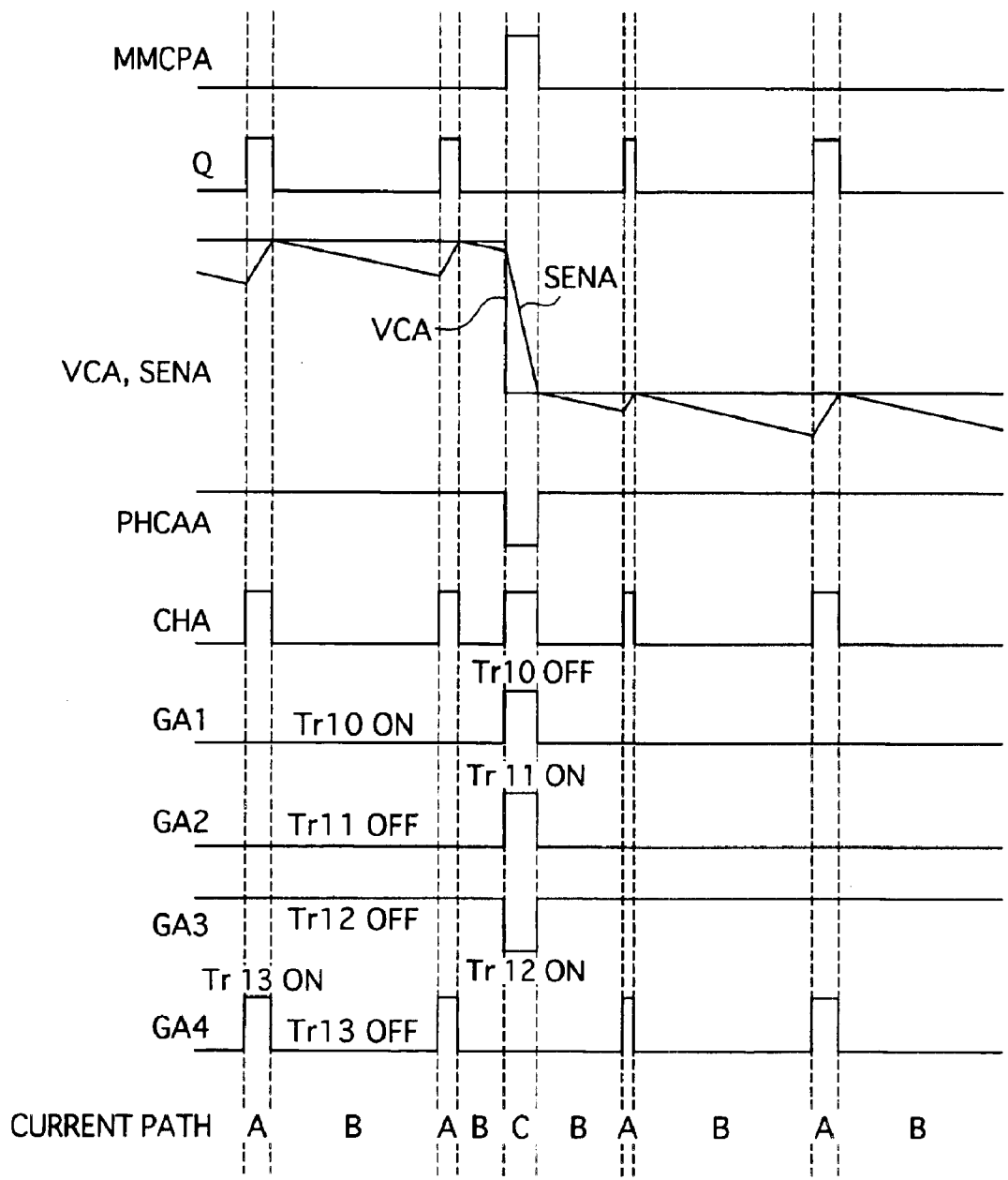
FIG. 4 is a timing chart showing main signals in an energization logic unit.

FIG. 4 is a timing chart showing main signals relating to the subject control operation. The example shown in the figure is the case where the polarity signal PHCA is "1".

Here, each of the gate signals GA1 and GA3 is a negative logic signal, so that a corresponding transistor conducts when the signal is "0". On the other hand, each of the gate signals GA2 and GA4 is a positive logic signal, so that a corresponding transistor conducts when the signal is "1".

Depending on combinations of the discharge instruction signal MMCPA and a supply instruction signal Q, the entire period of the coil current control is divided into (A) supply periods, (B) regenerative periods, and (C) discharge periods.

Figure 5:
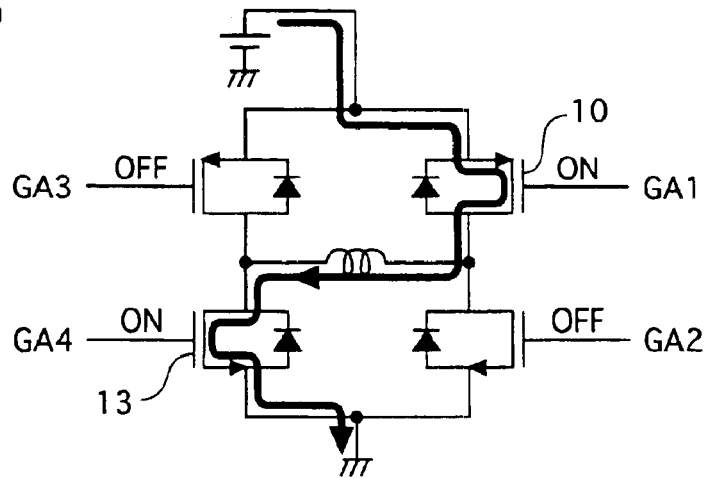
FIG. 5 is a schematic view showing current paths A, B, and C formed under control of the energization logic unit.
Figure 5:
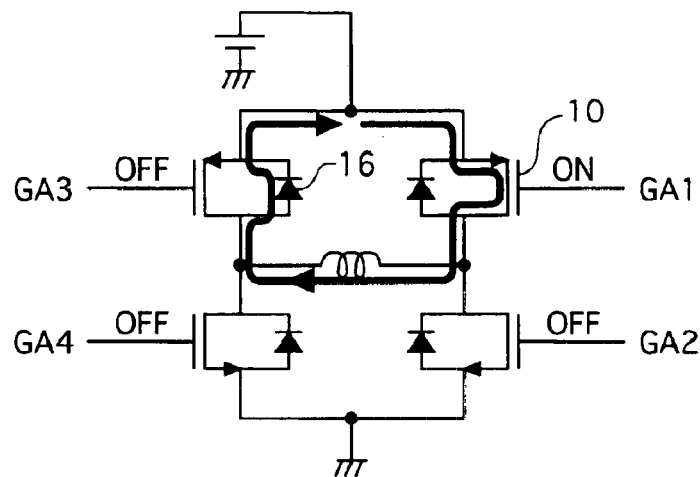
Figure 5:
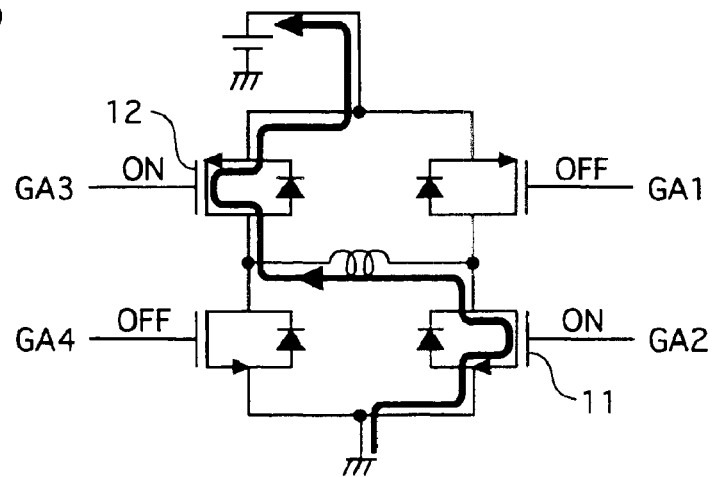

FIG. 5 is a schematic view showing current paths A, B, and C formed in each of the above-noted periods (A)–(C), respecitively.

(Control during Supply Period)

The PWM timing signal generation unit 1 generates a PWM timing signal instructing to start a supply period, at predetermined intervals (not illustrated). The flip-flop 5 is set when the PWM timing signal is "1", and consequently outputs "1" as a supply instruction signal Q indicating a supply period. In response, a signal CHA switches to "1".

During the time the discharge instruction signal MMCPA is "0" and the signal CHA is "1", the energization logic unit 6 supplies to the respective transistors, the gate signals GA1–GA4 that are obtained by logically combining the two signals and the polarity signal PHCA "1". As a result, the transistors 10 and 13 are put into a conducting state, and the transistors 11 and 12 into a non-conducting state.

With this operation, the current path A shown in FIG. 5 is formed. In this path, the supply current to the coil 19a flows through the transistors 10 and 13, and from the right to the left of the coil 19a as seen in the figure. Consequently, the supply current increases gradually.

The op-amp 4 compares the measurement signal SENA with the reference signal VCA. When the measurement signal SENA is higher than the voltage of the reference signal VCA (i.e. the measured supply current is higher than the current limit value shown by the reference signal VCA), the op-amp 4 issues a high-level output signal to reset the flip-flop 5.

As a result, the discharge instruction signal Q switches to "0", which in turn switches the gate signal GA4 to "0". Consequently, the transistor 13 is put into a non-conducting state, so that the supply current to the coil 19a is stopped.

(Control During Regenerative Period)

During the time the supply instruction signal Q and the discharge instruction signal MMCPA are both "0", the energization logic unit 6 outputs to respective transistors, the gate signals GA1–GA4 obtained by logically combining the two signals and the polarity signal PHCA "1". As a result, the transistor 10 is put into a conducting state, and the transistors 11, 12, and 13 are put into a non-conducting state.

With this operation, the current path B shown in FIG. 5 is formed. In this path, the regenerative current from the coil 19a circulates through the transistor 10 and the flywheel diode 16. Consequently, the regenerative current decreases gradually.

The above supply period and regenerative period are repeated each time the PWM timing signal is issued. With this arrangement, the coil current is regulated to the current limit value shown by the reference signal VCA.

(Control During Discharge Period)

As mentioned above, the discharge instruction signal generation unit 115a outputs the discharge instruction signal MMCPA "1" indicating a discharge period, at the time when the reference signal VCA decreases and for the duration substantially equal to the time taken for the discharge current to approach one step decrease of the reference signal VCA.

The energization logic unit 6 outputs to respective transistors, the gate signals GA1–GA4 obtained by logically combining the discharge instruction signal MMCPA "1", supply instruction signal CHA "0", and polarity signal PHCA "1". As a result, the transistors 11 and 12 are put into a conducting state, and the transistors 10 and 13 into a non-conducting state.

With this operation, the current path C shown in FIG. 5 is formed. In this path, the discharge current from the coil 19a flows back into the power supply circuit through the transistors 11 and 12. Consequently, the discharge current decreases gradually. It should be noted here that when flowing back to the power supply circuit, the discharge current decays more quickly than when circulating around the bridge rectification circuit through the flywheel diode, which exhibits a relatively high ON resistance.

The above discharge period is repeated each time the discharge instruction signal MMCPA is issued. This operation allows the coil current to follow the current limit value more accurately than by simply repeating the supply period and regenerative period.

Figure 6:
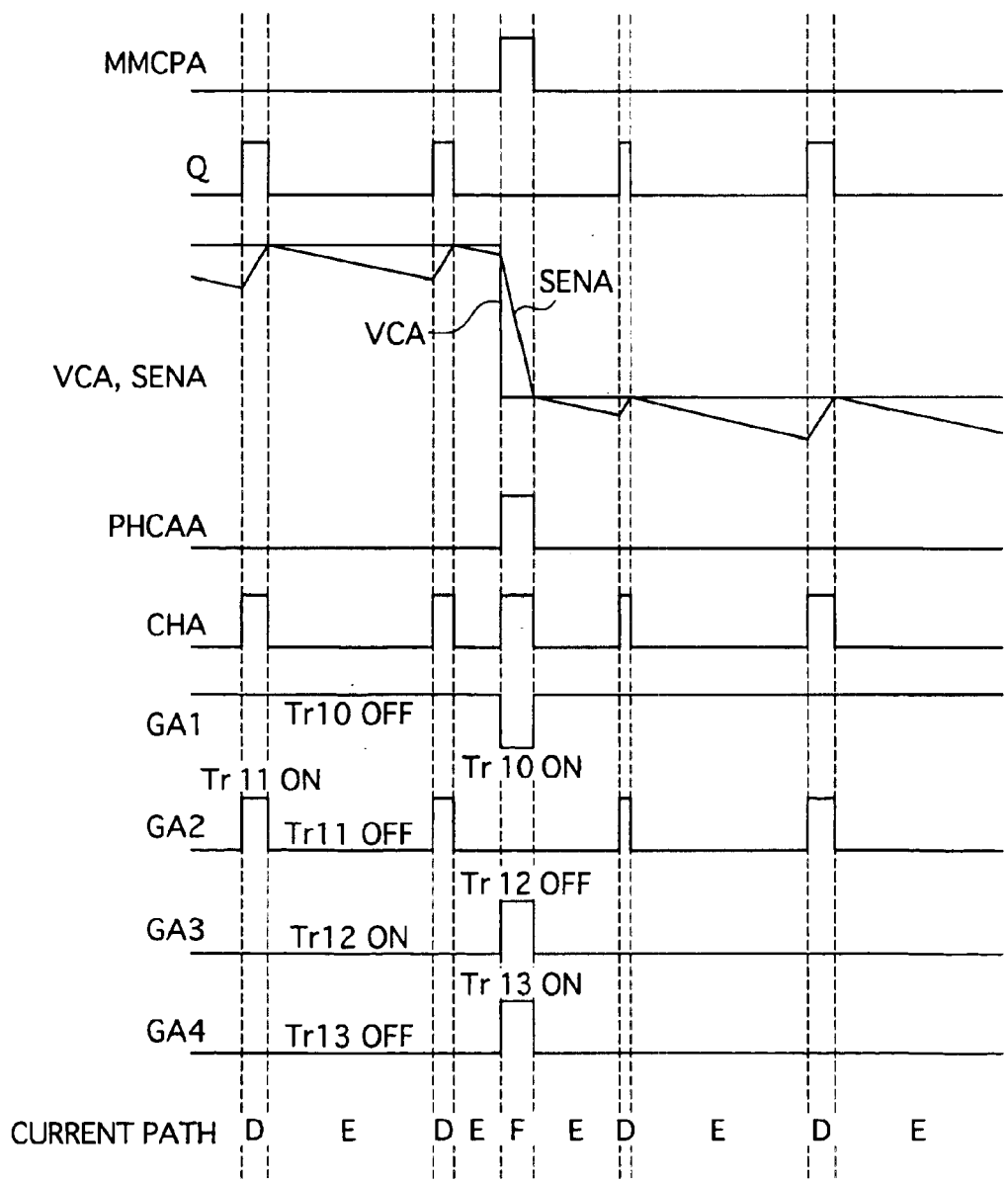
FIG. 6 is another timing chart showing the main signals in the energization logic unit.

FIG. 6 is a timing chart showing main signals relating to the control operation during the discharge period. The example shown in the figure is the case where the polarity signal PHCA is "0".

Similarly to the case where the polarity signal PHCA is "1", the entire period of the control is divided into (D) supply periods, (E) regenerative periods, and (F) discharge periods, depending on combinations of the discharge instruction signal MMCPA and the supply instruction signal Q.

Figure 7:
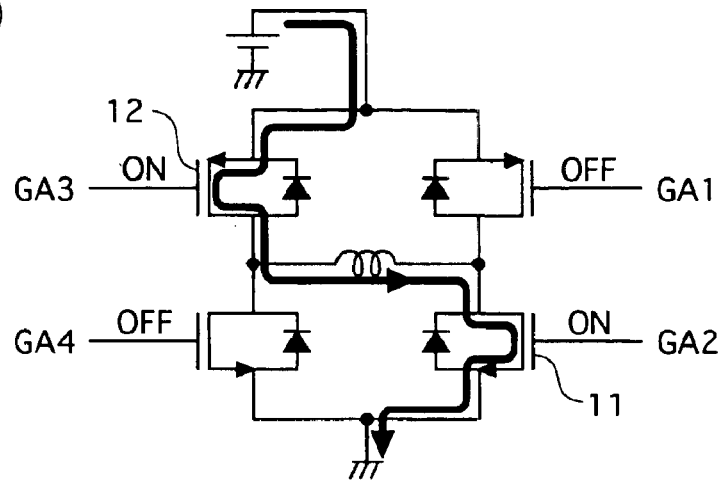
FIG. 7 is a schematic view showing current paths D, E, and F formed under control of the energization logic unit.
Figure 7:
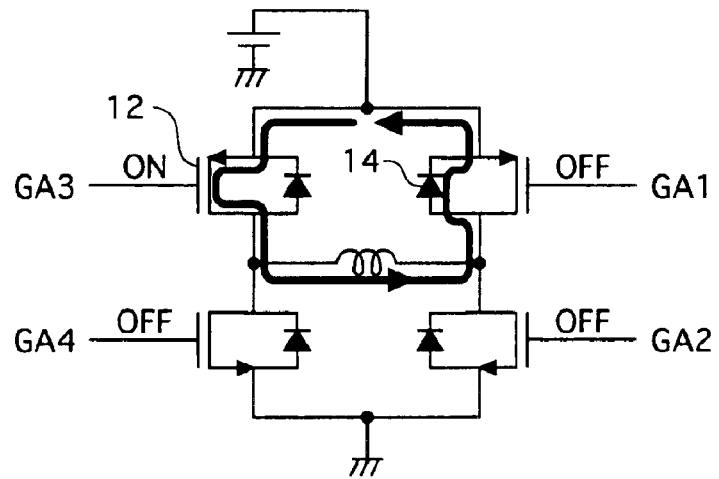
Figure 7:
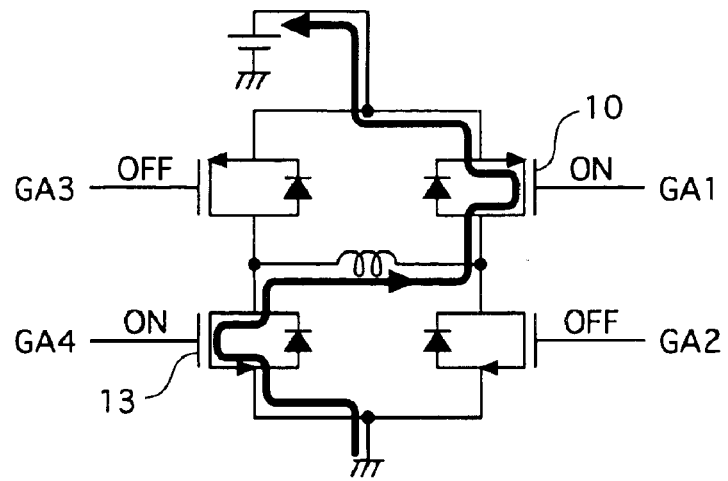

FIG. 7 is a schematic view showing current paths D, E, and F formed in the above-noted periods (D)–(F), respectively.

As is apparent from FIGS. 6 and 7, the only difference between the cases where the polarity signal PHCA is "0" and "1" is that the current flows through the coil in the opposite directions. That is to say, in the case where the polarity signal PHCA is "0", the current flows through the coil from the left to right as seen in the figure. Yet, the effect that the coil current accurately follows the current limit value is still archived.

As described above, the coil current follows the current limit value with improved accuracy. Hence, when a reference signal approximates a sinusoidal waveform aiming at achieving excellent suppression of noise and vibration, the coil current follows the reference signal accurately. As a result, the noise and vibration effect is archived as intended.

In addition, since the stepping motor drive device consistent with the embodiment 1 performs the PWM control using a current chopping method, the power consumption is lower than that required by a conventional voltage control.

Note that the coil current measurement unit 140a may be constituted simply with a resistor instead of the ON resistance adjustment circuit 24 and the transistor 23, or may be constituted without the op-amp 21.

Embodiment 2

A stepping motor drive device consistent with an embodiment 2 of the present invention differs from that of the embodiment 1 in that the duration of the discharge instruction signal MMCPA is variable according to a specifying signal. Hereinafter, description is given mainly to the difference from the embodiment 1.

(Construction Relating to Generation of Discharge Instruction Signal)

Figure 8:
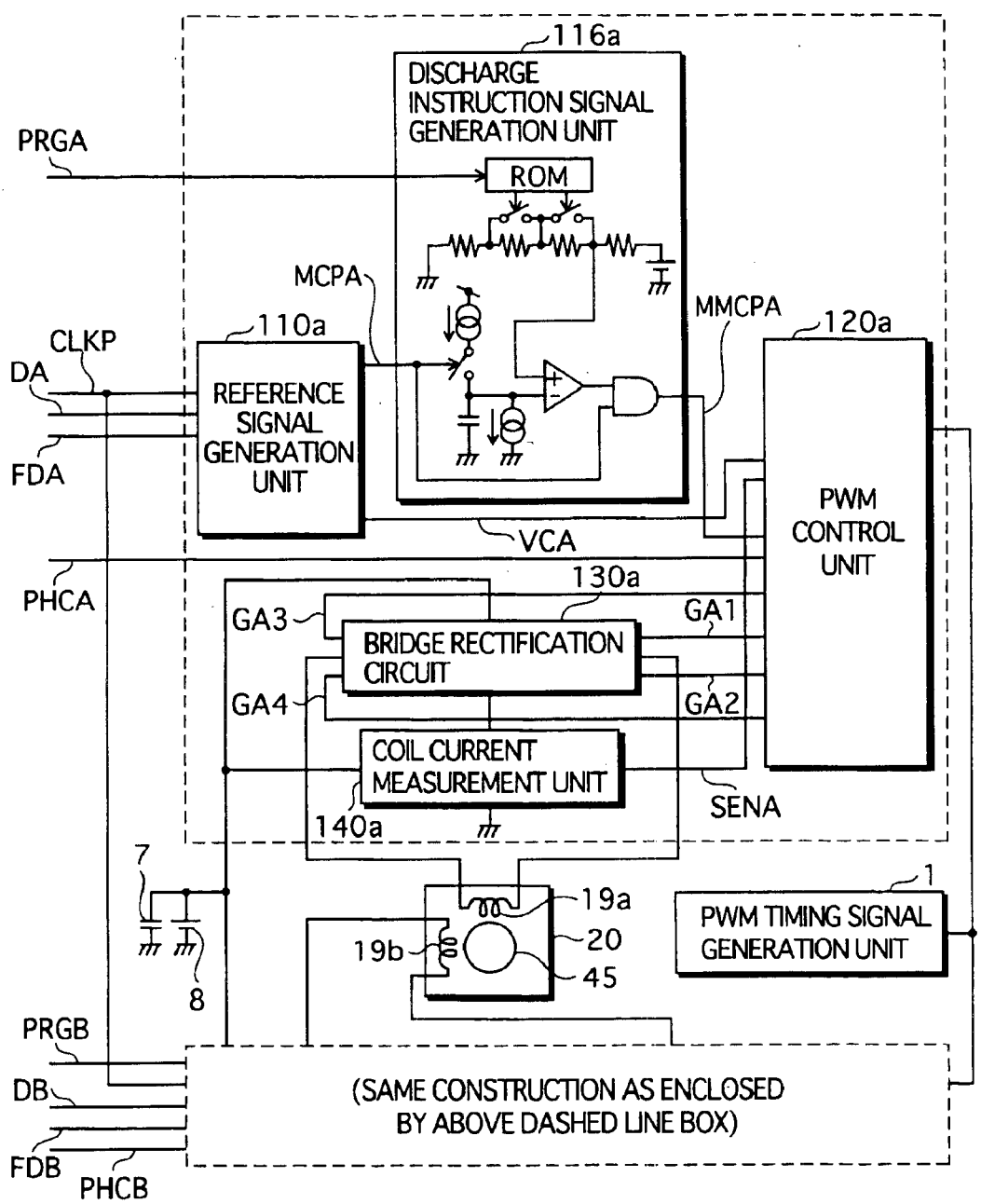
FIG. 8 is a functional block diagram showing a construction of another stepping motor drive device.

FIG. 8 is a functional block diagram showing a construction relating to the generation of discharge instruction signal. The difference from the embodiment 1 lies in a discharge instruction signal generation unit 116a.

The discharge instruction signal generation unit 116a acquires a specifying signal PRGA. With the use of a switch that is controlled by the specifying signal PRGA, the discharge instruction signal generation unit 116a generates a voltage at one of a plurality of levels. In addition, with the use of a constant current supply and a capacitor, the discharge instruction signal generation unit 116a converts the rising edge of the trigger signal MCPA to a ramp waveform with a constant gradient.

Concurrently with the rising edge of the trigger signal MCPA, the discharge instruction signal generation unit 116a outputs the discharge instruction signal MMCPA for the duration until the modulated ramp waveform exceeds the generated voltage.

With the construction stated above, even when the reference signal VCA decreases by different decrements in each step, an appropriate specifying signal PRGA enables the discharge instruction signal generation unit 116a to output the discharge instruction signal MMCPA for the duration substantially equal to the time taken for the discharge current to follow the decrement in each step.

The discharge instruction signal as described above ensures that the discharge current decreases by an amount that is precisely corresponding to the decrement of the reference signal VCA in each step, nether too much nor too little. Consequently, the discharge current follows the current limit value more accurately.

Embodiment 3

A stepping motor drive device consistent with an embodiment 3 is different from that of the embodiment 1 in that the duration of the discharge instruction signal MMCPA is determined based on a comparison between the discharge current and the current limit value. Hereinafter, description is given mainly to the difference from the embodiment 1.

(Construction Relating to Generation of Discharge Instruction Signal)

Figure 9:
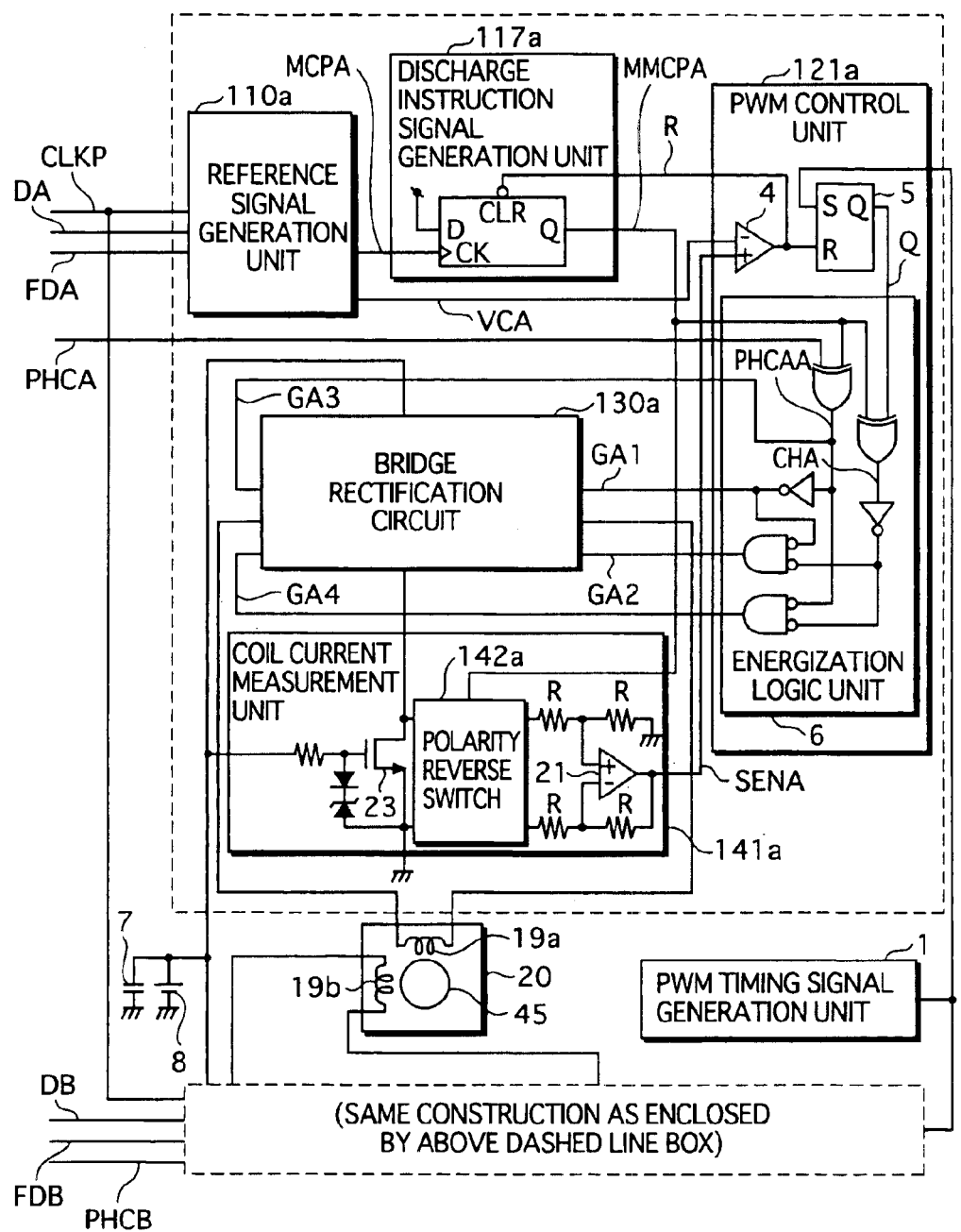
FIG. 9 is a functional block diagram showing a construction of another stepping motor drive device.

FIG. 9 is a functional block diagram showing a construction relating to the generation of discharge instruction signal. The difference from the embodiment 1 lies in a discharge instruction signal generation unit 117a and a coil current measurement unit 141a.

The coil current measurement unit 141a includes a polarity reverse switch 142a that outputs the voltage generated across the transistor 23 to the op-amp 21. The polarity reverse switch 142a reverses the polarity of the voltage, so that the voltage of the opposite polarity is outputted in the supply period and the discharge period. Since the supply current and the discharge current flow through the transistor 23 in opposite directions, reversing of the voltage polarity allows the op-amp 21 to measure an absolute value of the current flowing through the transistor 23.

Figure 10:
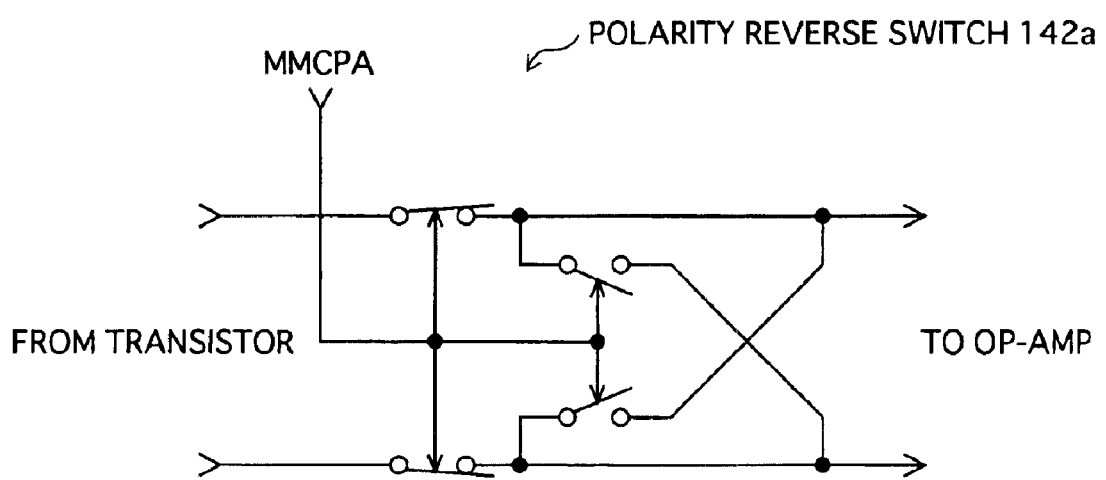
FIG. 10 is a functional block diagram showing a construction of a polarity reverse switch.

FIG. 10 shows one example of a construction of the polarity reverse switch 142a.

The discharge instruction signal generation unit 117a includes an edge trigger flip-flop. The edge trigger flip-flop is set in synchronism with a rising edge of the trigger signal MCPA, upon which the discharge instruction signal MMCPA starts to be outputted. At the time when the measurement signal SENA falls below the voltage of the reference signal VCA (i.e. the measured discharge current falls below the current limit value shown by the reference signal VCA), the output signal of the op-amp 4 switches to a low level, thereby clearing the edge trigger flip-flop. As a result, the discharge instruction signal MMCPA is stopped.

That is to say, the discharge instruction signal MMCPA is outputted for the duration starting at a point of time when the current limit value shown by the reference signal VCA decreases until a point of time when the measured discharge current falls below the decreased current limit value.

The discharge instruction signal MMCPA as described above ensures that the discharge current is reduced by an amount that precisely corresponds to a decrement of the VCA reference signal in each step, nether too much nor too little. Consequently, the discharge current follows the current limit value more accurately.

Embodiment 4

A stepping motor drive device consistent with an embodiment 4 of the present invention differs from that of the embodiment 1 in that synchronous rectification control is performed. The synchronous rectification control is performed during the regenerative period. To perform the synchronous rectification control, an energization logic unit 46 puts two of the transistors 10 and 12 constituting the bridge rectification circuit into a conducing state, so that the regenerative current from the coil 19a circulates through the transistors 10 and 12. Hereinafter, description is given mainly to the difference from the embodiment 1.

(Details of Energization Logic Unit 46)

Figure 11:
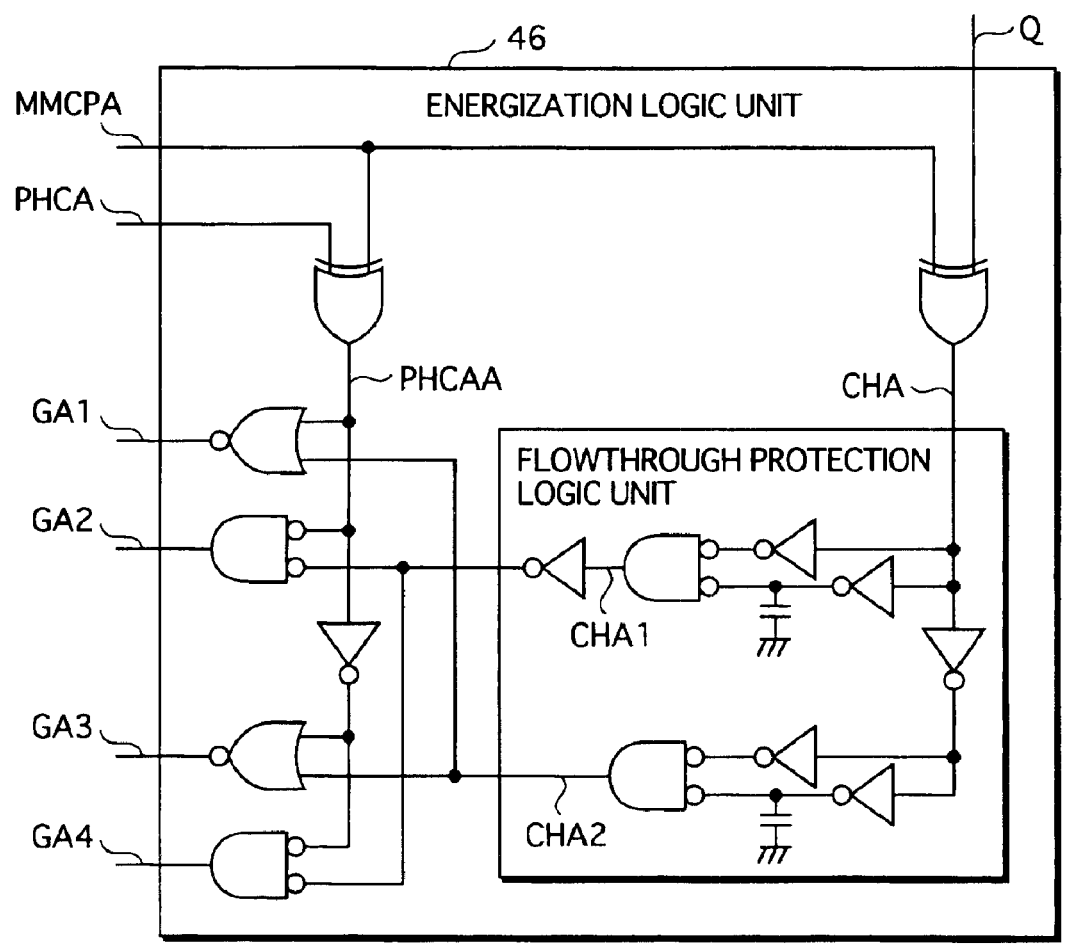
FIG. 11 is a functional block diagram showing a construction of another energization logic unit.

FIG. 11 is a functional block diagram showing a detailed construction of the energization logic unit 46 that performs the synchronous rectification control.

The energization logic unit 46 includes a flow through protection logic unit that generates a signal CHA1 and signal CHA2. The signal CHA1 indicates a period obtained by shortening a period during which the signal CHA is "1", and the signal CHA2 indicates a period obtained by shortening a period during which the signal CHA is "0". By logically combining the signals CHA1 and CHA2, the discharge instruction signal MMCPA, and the polarity signal PHCA, the flow through protection logic unit generates gate signals GA1–GA4.

Figure 12:
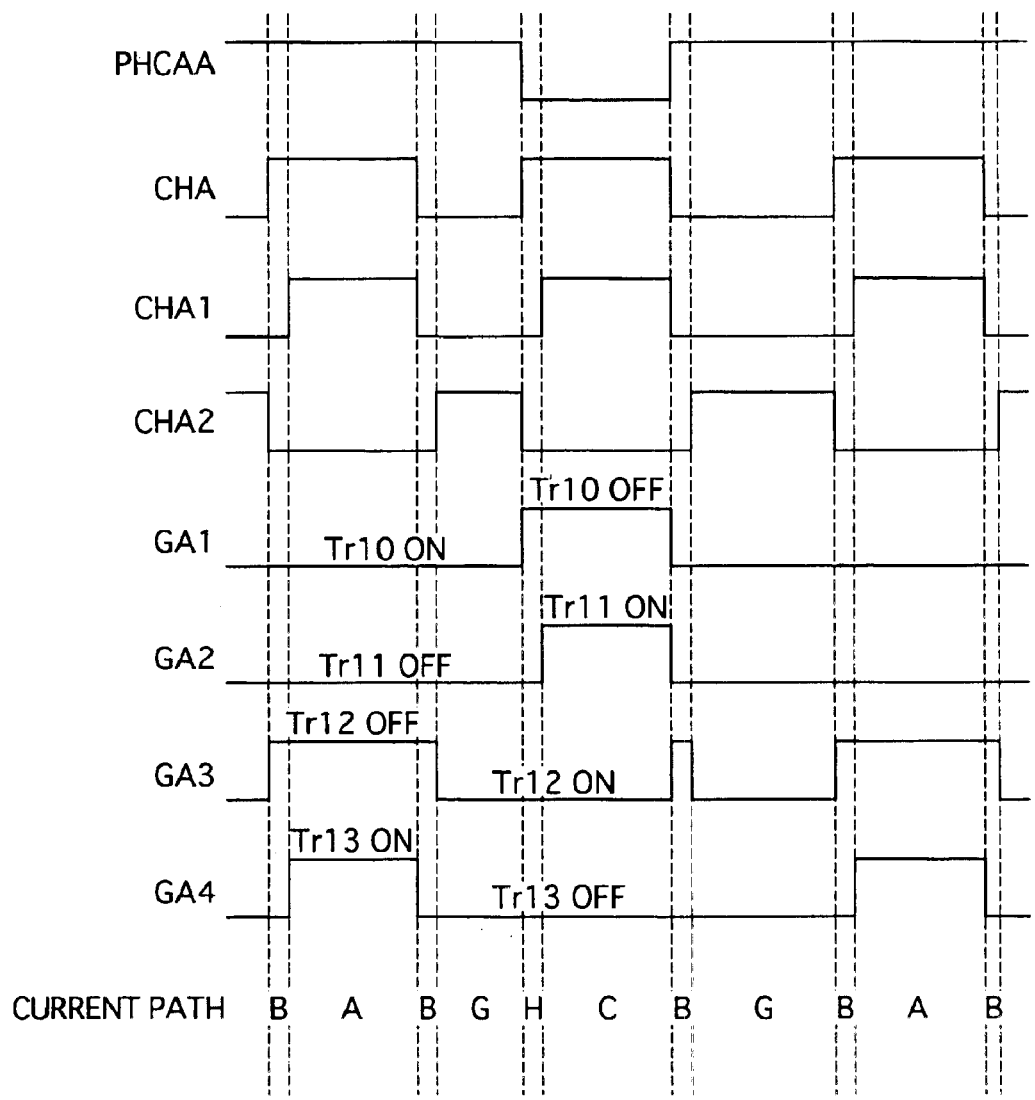
FIG. 12 is a timing chart showing main signals in the energization logic unit.

FIG. 12 is a timing chart showing the main signals in the energization logic unit 46. The example shown in the figure is the case where the polarity signal PHCA is "1".

According to combinations of the discharge instruction signal MMCPA and the signals CHA1 and CHA2, the entire period of the synchronous rectification control is divided into (A) shortened supply periods, (B) first flow through protection periods, (C) shortened discharge periods, (G) synchronous rectification periods, and (H) second flow through protection periods.

FIG. 12 is a schematic view showing current paths G and H that are formed in (G) synchronous rectification period and (H) second flow through protection period, respectively.

Note that gate signals and resulting current paths formed in (A) shortened supply period, (B) first flow through protection period, and (C) shortened discharge period are the same as the ones formed in (A) supply period, (B) regenerative period, and (C) discharge period described in the embodiment 1 (See FIG. 5, for reference).

(Control During Synchronous Rectification Period)

During the time the discharge instruction signal MMCPA is "1", the signal CHA1 is "0", and the signal CHA2 is "1", the energization logic unit 46 supplies to the respective resistors, gate signals GA–GA4 that are obtained by logically combining the three signals and the polarity signal PHCA "1". As a result, the transistors 10 and 12 are put into a conductive state and the transistors 11 and 13 into a non-conductive state.

Figure 13:
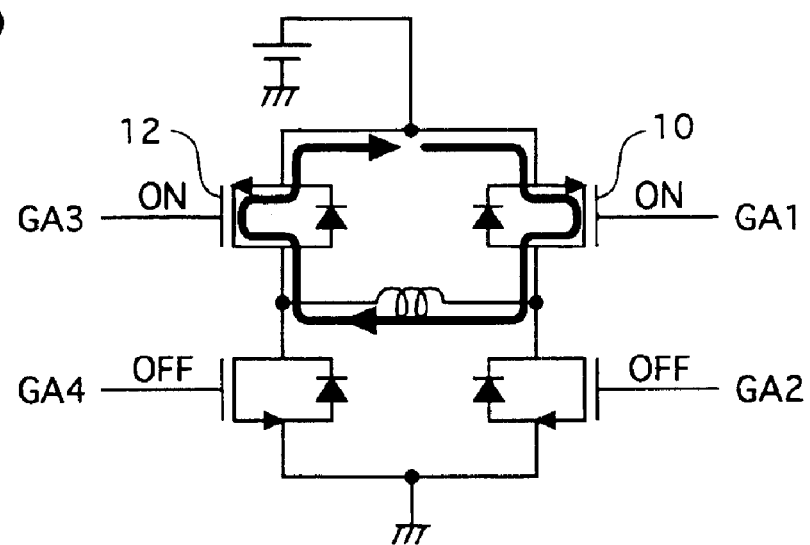
FIG. 13 is a schematic view showing current paths G and H formed under control of the energization logic unit.
Figure 13:
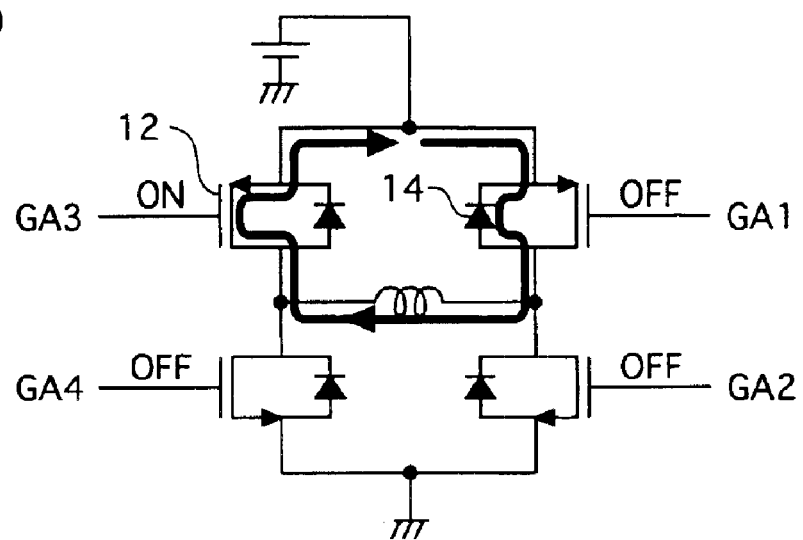

With this operation, the current path G shown in FIG. 13 is formed. In this path, the regenerative current from the coil 19a circulates through the transistors 10 and 12, so that the regenerative current decreases gradually. In the current path G, the regenerative current flows through the transistor 12, unlike the current path formed in the above-mentioned regenerative period (which corresponds to the first flow through protection period under the synchronous rectification control).

In general, ON resistance of transistors is smaller than ON resistance of diodes. Thus, in the synchronous rectification periods, the coil current decays more slowly than in the above-described regenerative periods. In other words, the energy remaining in the coil is maintained within the bridge rectification circuit, thereby improving energy efficiency.

(Control During Flow through Protection Period)

The first and second flow through protection periods are provided in the transitions between a supply period, a synchronous rectification period, and a discharge period. With provision of the first and second flow through protection periods, it is avoided that two serially connected transistors 10 and 11 or 12 and 13 are concurrently put into a conducting state, which would result in short-circuit.

Note that current paths formed when the polarity signal PHCA is "0" (not illustrated) are substantially the same as those formed when the polarity signal PHCA is "1", except that the current flows in the opposite direction. Yet, similarly to the case where the polarity signal PHCA is "1", the coil current follows the current limit value with improved accuracy.

Embodiment 5

A stepping motor drive device consistent with an embodiment 5 of the present invention differs from that of the embodiment 3 in that the supply current to the coil is measured using one of the transistors constituting the bridge rectification circuit. Hereinafter, description is given mainly to the difference from the embodiment 3.

(Overall Construction)

Figure 14:
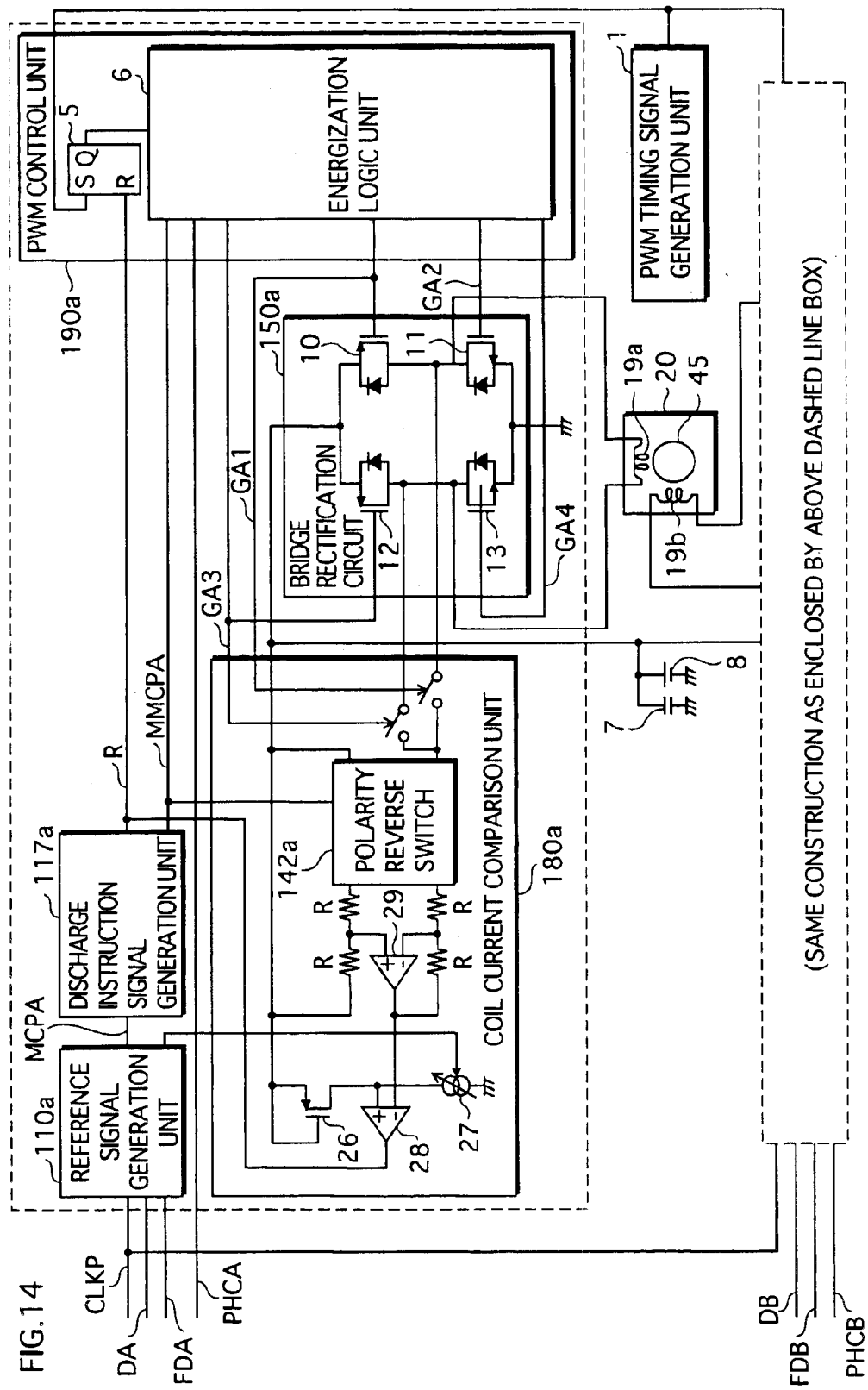
FIG. 14 is a functional block diagram showing a construction of another stepping motor drive device.

FIG. 14 is a functional block diagram showing an overall construction of the stepping motor drive device of the embodiment 5. The figure also shows a stepping motor that is driven by the stepping motor drive device.

Note that the same reference numerals are used to denote the same components as those in the embodiment 3, and thus description thereof is not repeated here. Also, since the same set of components is provided for each coil, description below is given only to the components provided for the first coil 19a.

The stepping motor drive device of this embodiment includes the PWM timing signal generation unit 1, the reference signal generation unit 110a, the discharge instruction signal generation unit 117a, a PWM control unit 190a, a bridge rectification circuit 150a, a coil current comparison unit 180a, the power supply 8, and the DC coupling capacitor 7. The power supply 8 and the capacitor 7 are connected in parallel and together form a power supply circuit.

The bridge rectification circuit 150a differs from the bridge rectification circuit 130a in that drain voltage of the transistors 10 and 12 is outputted to outside of the bridge rectification circuit 150a.

The coil current comparison unit 180a includes a reference current source 27, a transistor 26, op-amps 28 and 29, a polarity reverse switch 142a, and a switch for selecting drain voltage of one of the transistors 10 and 12.

The PWM control unit 190a is different from the PWM control unit 120a in that the op-amp 4 is omitted and that the flip-flop 5 is reset in response to a comparison-result signal R supplied from the coil current comparison unit 180a.

(Details of Coil Current Comparison Unit 180a)

With reference to the polarity signal PHCA, the coil current comparison unit 180a selects the drain voltage of one of the transistors 10 and 12 that is put into a conducting state.

The polarity reverse switch 142a outputs the difference between the selected drain voltage and the power supply voltage (i.e. the voltage across the transistor 10 or 12) to the op-amp 29. The polarity reverse switch 142a reverses the polarity of the voltage, so that the voltage of the opposite polarity is outputted in the supply period and the discharge period. Since the supply current and the discharge current flow in opposite directions, by reversing the voltage polarity, the op-amp 21 is allowed to measure an absolute value of a current flowing through the transistor 10 or 12.

The reference current source 27 supplies a reference current to the transistor 26 that is in a conducting state, according to the reference signal VCA. In response, the transistor 26 generates a drain voltage according to the reference current.

The op-amp 28 outputs a comparison-result signal R at a high level when the drain voltage of the transistor 26 is higher than the output voltage of the op-amp 29. The comparison-result signal R at a high level indicates that the voltage generated across the transistor 26 is lower than the voltage generated across the transistor 10 or 12 (i.e. the measured coil current exceeds the current limit value shown by the reference signal VCA).

As described above, with respect to the comparison between the coil current and the current limit value, the op-amp 28 outputs the comparison-result signal R that indicates the same comparison result as the one made by the op-amp 4 of the embodiment 3. The rest of the components of the stepping motor drive device operate in a similar manner to the embodiment 3, according to the comparison-result signal R.

Consequently, the construction of this embodiment achieves the same effect as that of the embodiment 3. Further, since there is no need for a dedicated resistor for measuring a current to be serially inserted into the current path, the stepping motor is driven more efficiently.

Embodiment 6

Now, description is given to a stepping motor drive device consistent with an embodiment 6 of the present invention. Unlike the stepping motor drive device of the embodiment 1, the stepping motor drive device of this embodiment receives serial data showing a level of each step of a staircase waveform, and generates the reference signal based on the received serial data. Hereinafter, description is given mainly to the difference from the embodiment 1.

(Overall Construction)

Figure 15:
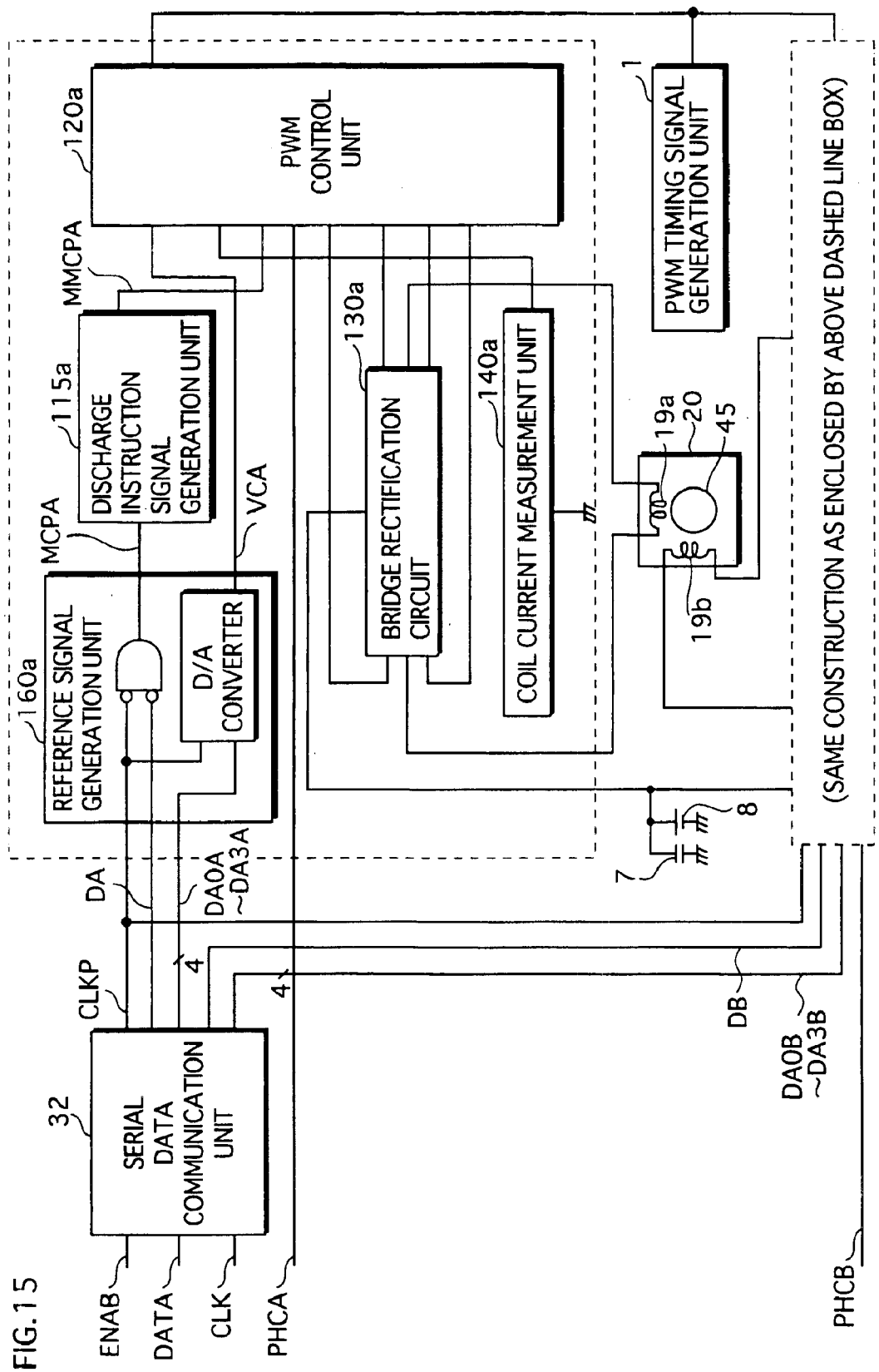
FIG. 15 is a functional block diagram showing a construction of another stepping motor drive device.

FIG. 15 is a functional block diagram showing an overall construction of the stepping motor drive device consistent with the embodiment 6.

Note that the same reference numerals are used to denote the same components as the embodiment 1, and thus description thereof is not repeated here. Also, since the same set of components is provided for each coil, description below is given only to the components provided for the first coil 19a.

The stepping motor drive device includes the PWM timing signal generation unit 1, a serial data communication unit 32, a reference signal generation unit 160a, the discharge instruction signal generation unit 115a, the PWM control unit 120a, the bridge rectification circuit 130a, the coil current measurement unit 140a, the power supply 8, and the DC coupling capacitor 7. The power supply 8 and the capacitor 7 are connected in parallel and together form a power supply circuit.

The serial data communication unit 32 receives a serial information signal DATA for each reference signal under the control based on communication control signals ENAB and CLK. The serial information signal DATA shows a level of each step of a staircase waveform as well as a rise or fall of each step. Upon receipt, the serial data communication unit 32 converts the received serial information signal DATA to parallel data. In addition, the serial data communication unit 32 supplies the resulting parallel data to the reference signal generation unit 160a of a corresponding coil together with the clock signal CLKP at time intervals corresponding to units of steps.

The reference signal generation unit 160a is similar to the reference signal generation unit 110a, except that the step-frequency switch unit and the up-down counter are omitted and that the trigger signal MCPA is generated through different logical operations. Upon receipt of parallel data showing a level of each step from the serial data communication unit 32, the reference signal generation unit 160a digital-to-analog converts the parallel data at intervals corresponding to units of steps, thereby generating the reference signal VCA.

(Details of Serial Data)

Figure 16:
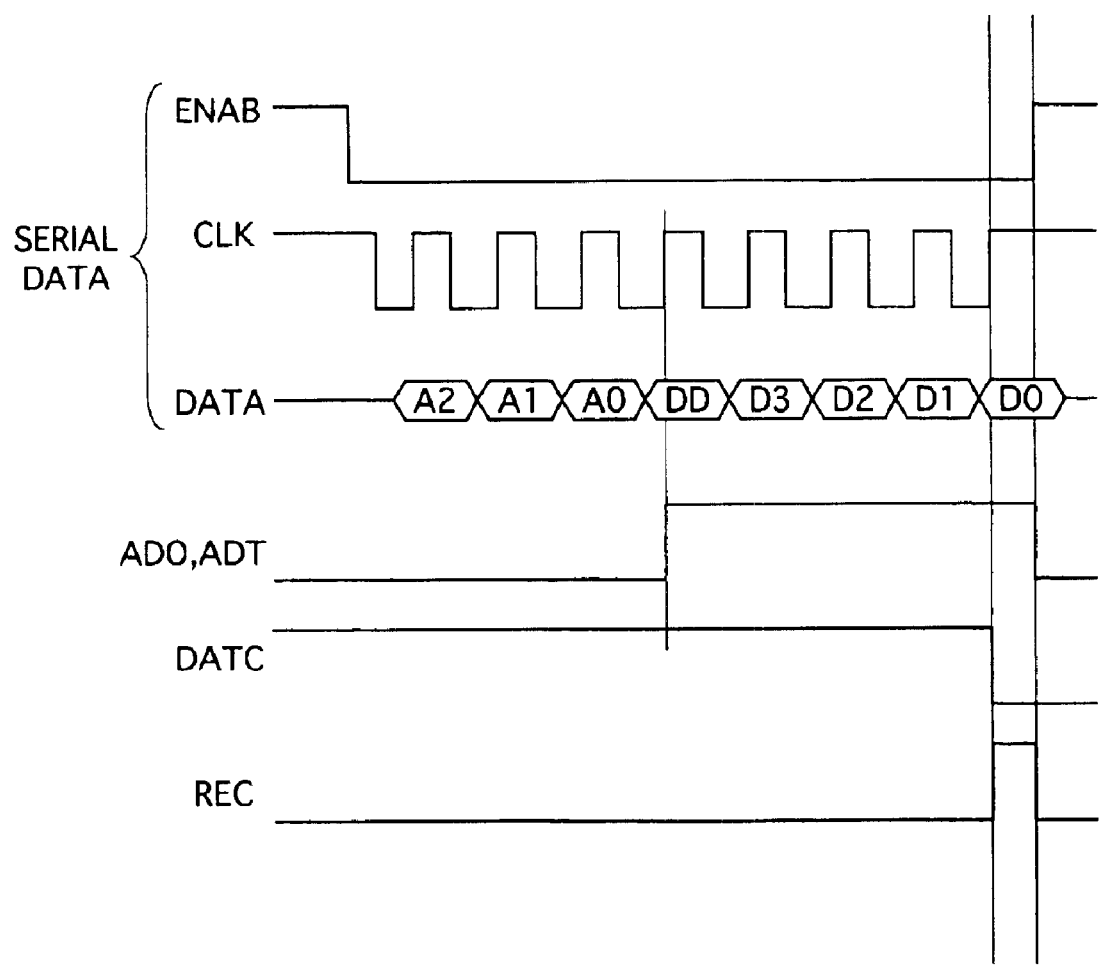
FIG. 16 is a timing chart showing main signals in a serial data communication unit.

FIG. 16 is a timing chart showing one unit of serial data corresponding to one step of a reference signal for one of the coils. The serial data communication unit 32 receives, for each reference signal to be supplied to a corresponding coil, such serial data for a plurality of steps in sequence. In the figure, ENAB is a unit time signal, CLK is a bit synchronization signal, and DATA is an information signal.

One unit of information signal DATA is made up of 8 bits. The first 3 bits are an address A2–A0 for identifying a corresponding coil, the next bit is an up-down bit DD, and the remaining 4 bits are data D3–D0 showing a step level.

Note that FIG. 16 also shows the transition timing of main signals in the serial data communication unit 32 together with the reception timing of the serial data.

(Details of Serial Data Communication Unit 32)

Figure 17:
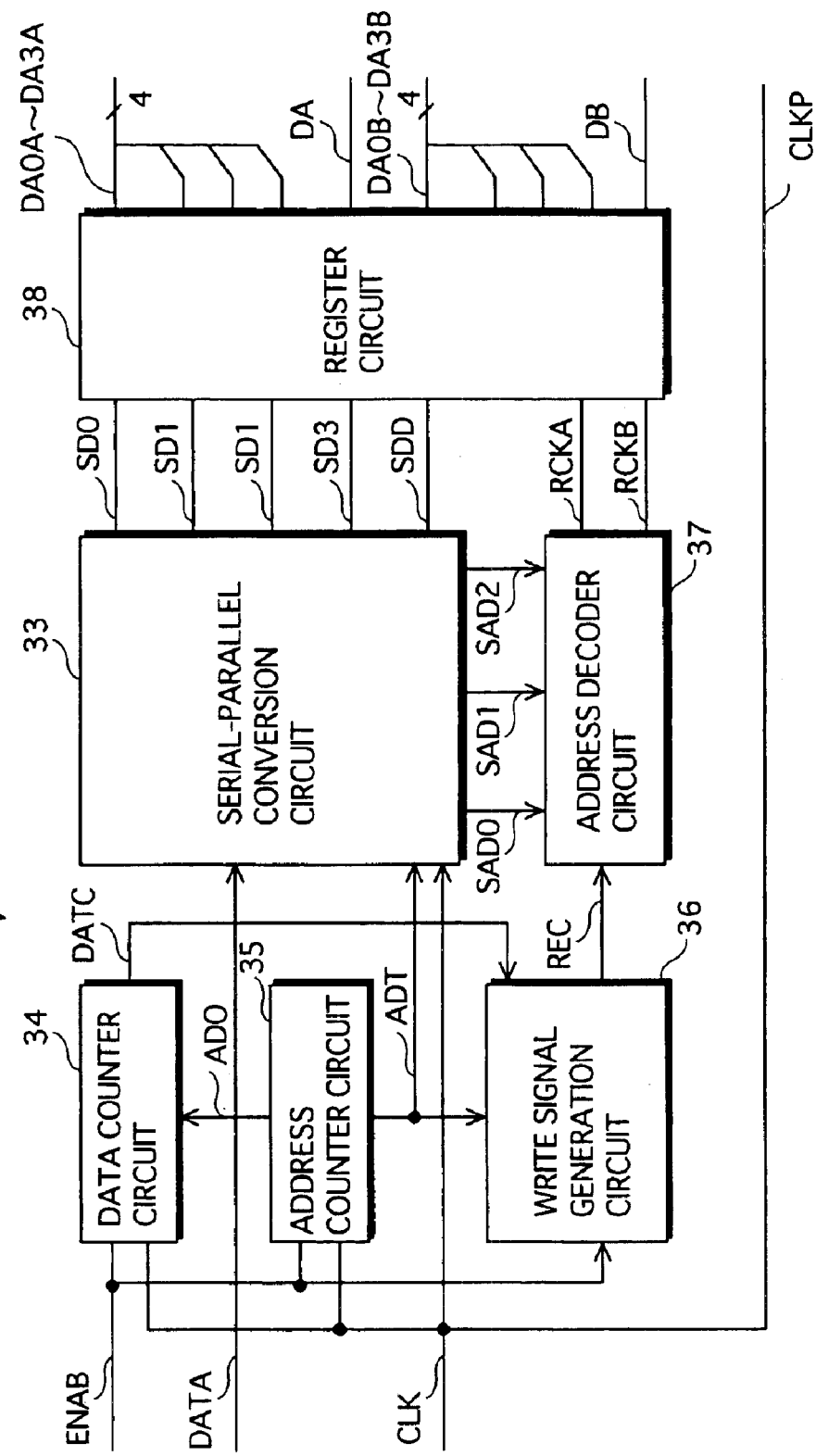
FIG. 17 is a block diagram showing a construction of the serial data communication unit.

FIG. 17 is a block diagram showing a detailed construction of the serial data communication unit 32. The serial data communication unit 32 includes an address counter circuit 35, a data counter circuit 34, a serial-parallel conversion circuit 33, a write signal generation circuit 36, an address decoder circuit 37, and a resister circuit 38.

Figure 18:
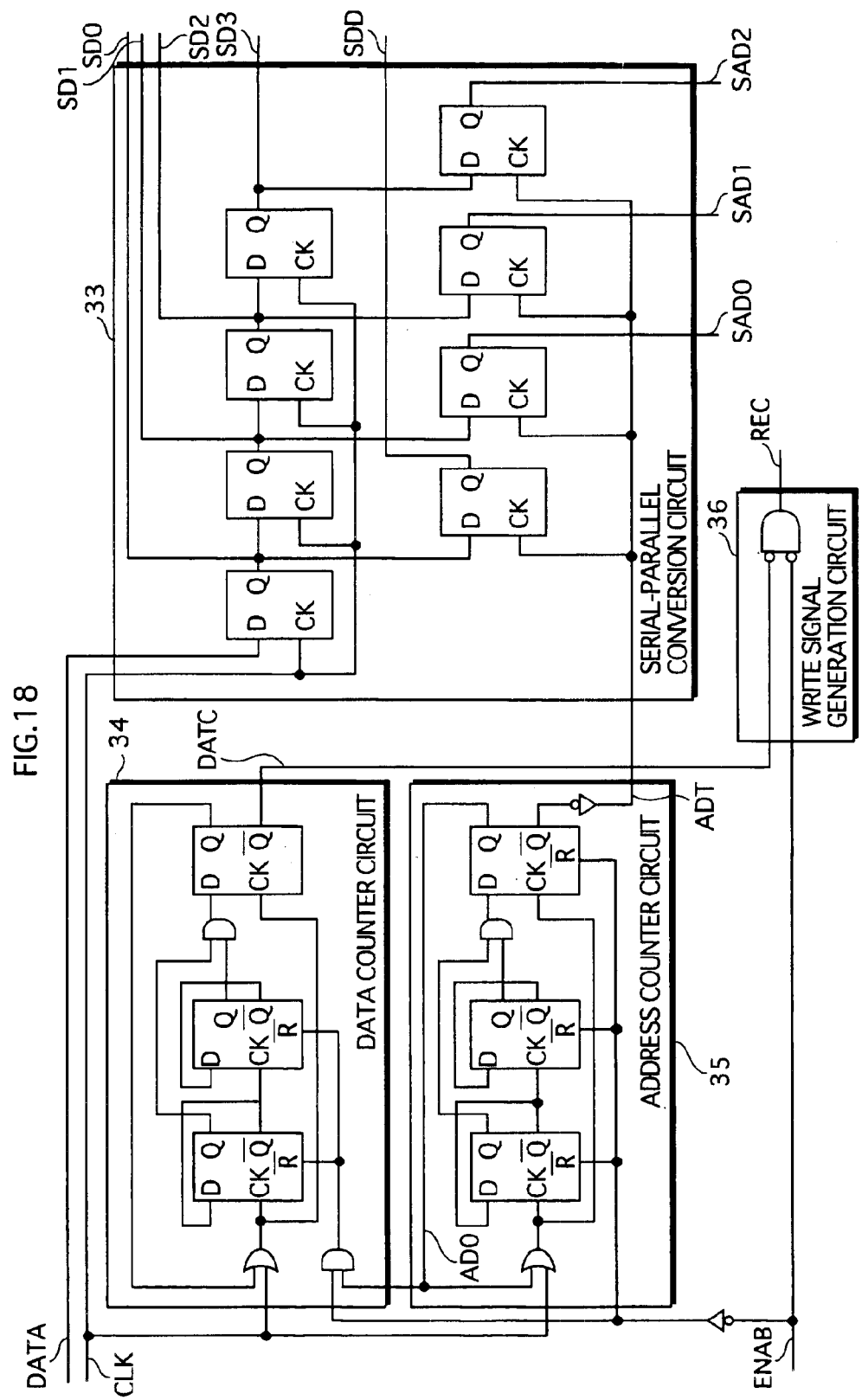
FIG. 18 is a functional block diagram showing constructions of an address counter circuit, a data counter circuit, a serial-parallel conversion circuit, and a write signal generation circuit.

FIG. 18 is a functional block diagram showing detailed constructions of the address counter circuit 35, the data counter circuit 34, the serial-parallel conversion circuit 33, and the write signal generation circuit 36.

The address counter circuit 35 counts the bit synchronization signal CLK for the first four bits of one unit of serial data, and outputs address completion signals ADO and ADT indicating that reception of the first four bits of information signal DATA has been completed.

Triggered by the address completion signal ADO, the data counter circuit 34 counts the bit synchronization signal CLK for the latter 4 bits of the serial data, and outputs a data completion signal DATC indicating that reception of all eight bits of the information signal data DATA has been completed.

Figure 20:
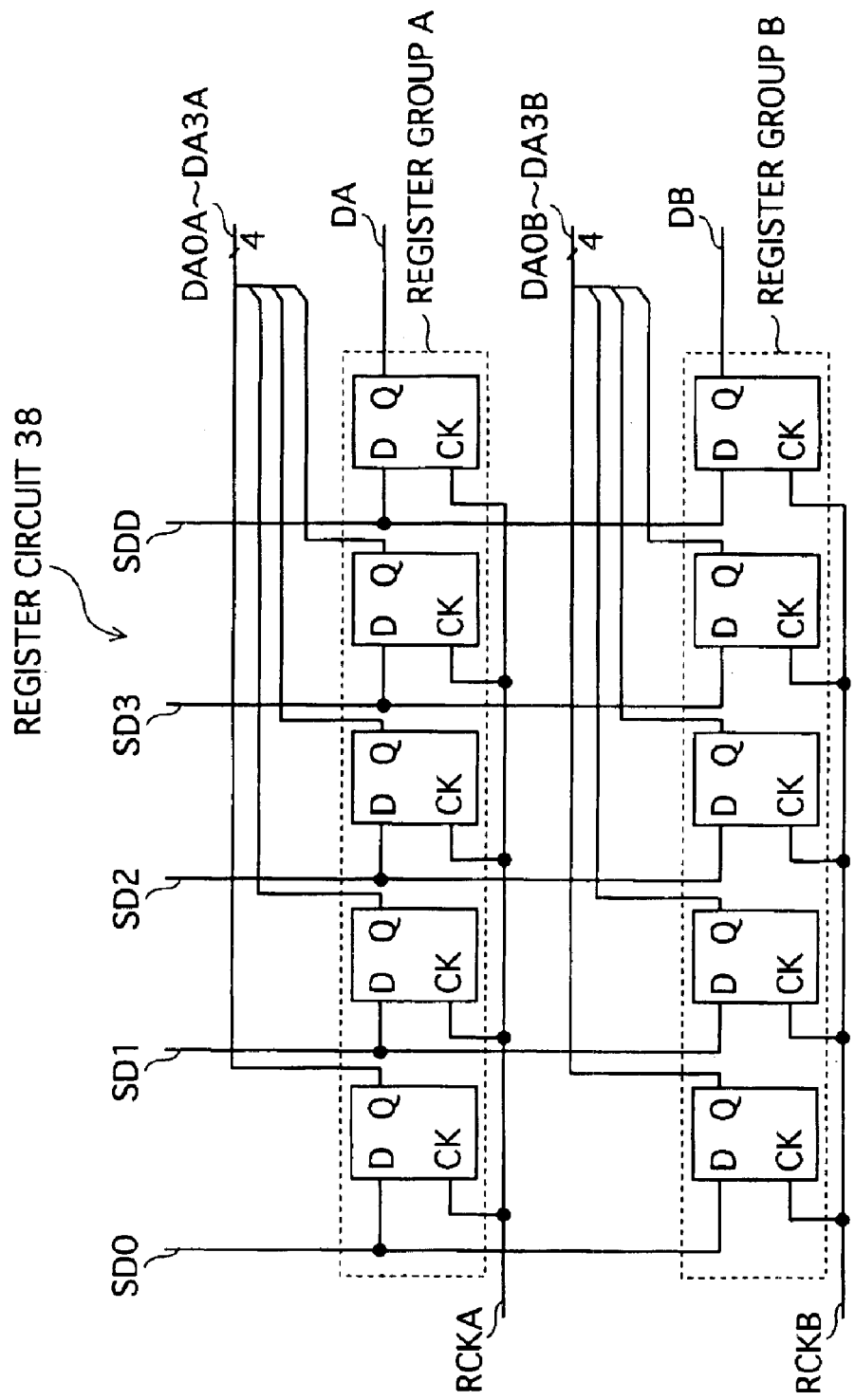
FIG. 20 is a functional block diagram showing a construction of the resister circuit.
Figure 21:
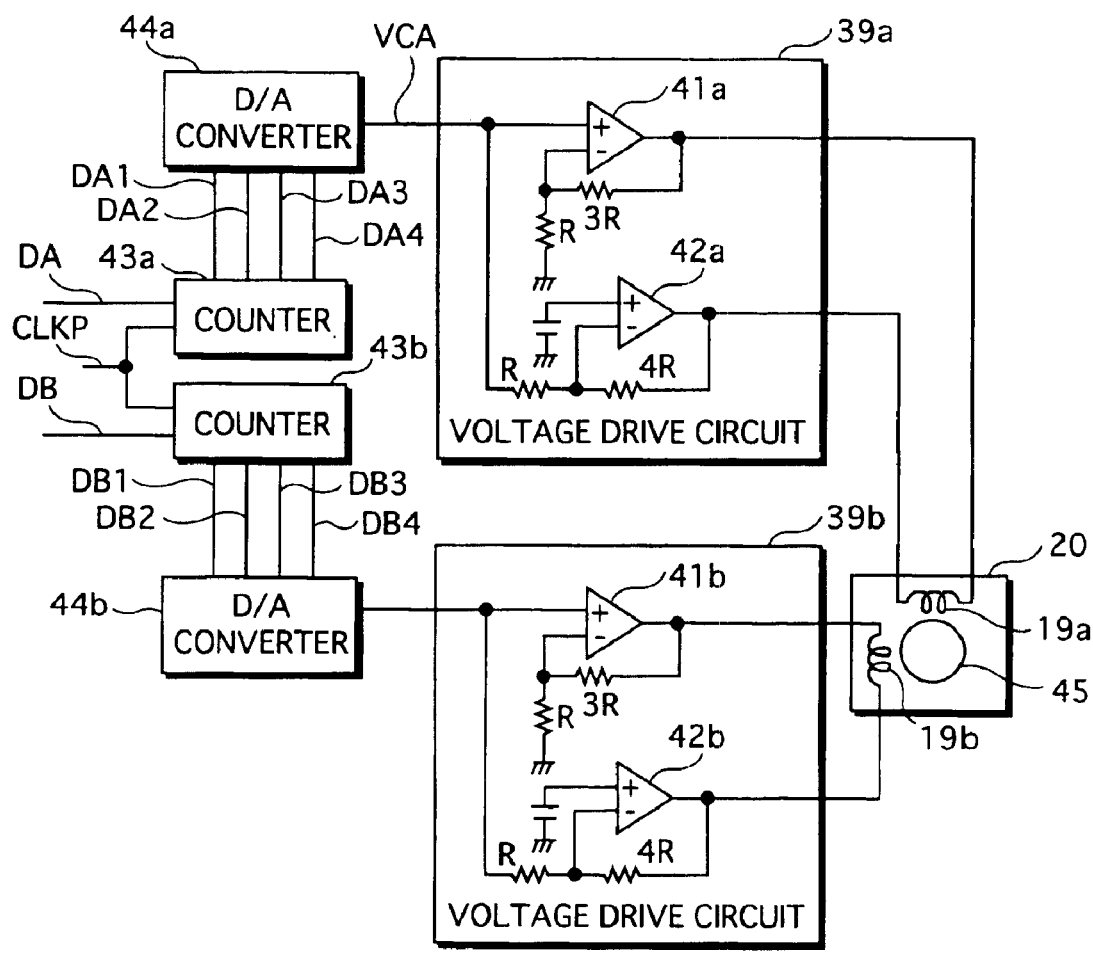
FIG. 21 is a functional block diagram showing a construction of a conventional stepping motor drive device.

The serial-parallel conversion circuit 33 converts the information signal DATA to parallel data, using a shift register which is made up of four flip-flops shown in the upper row in FIG. 20. In synchronism with the rising edge of the address completion signal ADT, the serial-parallel conversion circuit 33 latches the address SAD0–SAD2 and the up-down bit DD which constitute the first 4 bits into four flip-flops shown in the lower row in FIG. 20. As a result, the address SAD0–SAD2 and up-down bit DD are separated from the data SD0–SD3 which constitute the latter 4 bits.

The write signal generation circuit 36 outputs the write signal REC during the time both the data completion signal DATC and unit time signal ENAB are outputted.

Figure 19:
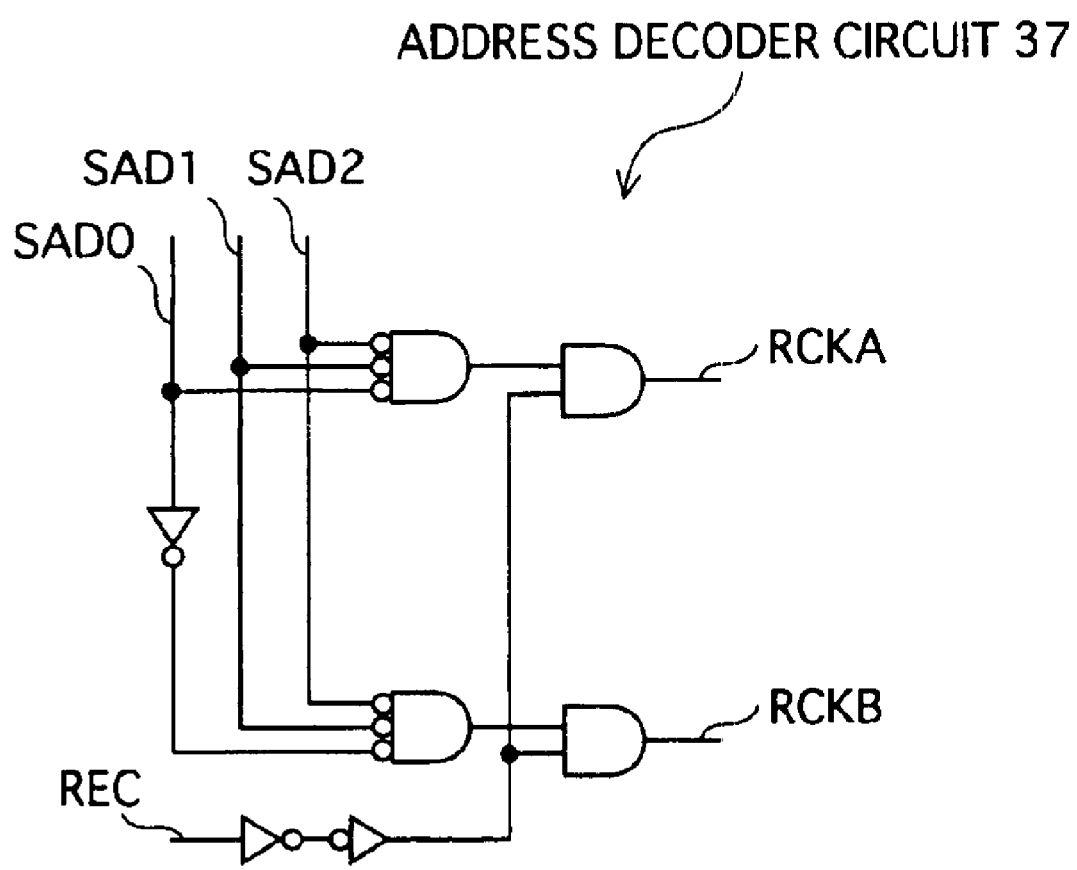
FIG. 19 is a functional block diagram showing a construction of the address decoder circuit.

FIG. 19 is a functional block diagram showing a detailed construction of the address decoder circuit 37.

The address decoder circuit 37 generates signals RCKA and RCKB each of which instructs one of 5-bit register groups provided in the register circuit 38 to store the data SD0–SD3 and up-down bit DD. The signals RCKA and RCKB are generated in accordance with the write signal REC and address SAD0–SAD2.

FIG. 20 is a functional block diagram showing a detailed construction of the resister circuit 38.

The resister circuit 38 has 5-bit register groups A and B for the first coil 19a and the second coil 19b, respectively. Upon receipt of the signal RCKA, the register circuit 38 stores the data SD0–SD3 and up-down bit DD to the register group A, and outputs the stored data as 5-bit parallel signals DA0A–DA3A and DA. Upon receiving signal RCKB, on the other hand, the register circuit 38 stores the data SD0–SD3 and up-down bit DD to the register group B, and outputs the stored data as 5-bit parallel signal DA0B–DA3B and DB.

As described above, the reference signal generation unit 160a substantially acts as a D/A converter, and generates the reference signal VCA by digital-to-analog converting parallel data DA0A–DA3A at intervals corresponding to units of steps that are shown by clock signal CLKP.

According to this embodiment, the level of each step of the reference signal VCA is designated one by one by serial data. This makes it possible to generate not only the reference signal VCA that approximates a trapezoidal waveform mentioned in the embodiment 1, but also the reference signal VCA that approximates any waveform as desired. For example, if serial data is generated by sampling a sinusoidal wave, the reference signal that approximates a sinusoidal waveform can be obtained.

Other Modifications

Although the present invention has been described by way of the above embodiments, it is naturally appreciated that the present-invention is not limited to the specific embodiments above. Various modifications as follows still fall within the scope of the present invention.

(1) The present invention may be embodied as a computer program executed by a computer to carry out any of stepping motor drive methods described in the above embodiments. Further, the present invention may be embodied as a digital signal representing such a computer program.

Further, the present invention may be embodied as a computer-readable recording medium storing the above computer program or digital signal. Examples of such a computer-readable recording medium include a flexible disk, a hard disk, a CD (Compact Disc), an MO (Magneto-Optical) disc, a DVD (Digital Versatile Disc), and a semiconductor memory.

Still further, the present invention may be embodied as the above computer program or digital signal that is transmitted via a network, such as an electronic communications network, a wired or wireless communications network, or the Internet.

Still further, the above program or digital signal may be transferred to another independent computer system, in form of a recording medium mentioned above or via any of the above network. The independent computer system may then execute the computer program or digital signal.

(2) The above embodiments describe the case where the transistors 11 and 13 are used to perform the chopping control on the supply current. However, the copping control may be performed by the transistors 10 and 12 and still achieves the same suppression effect of vibration and noise.

(3) The above embodiments relates to a 2-phase stepping motor, but the applications of the present invention is not limited to a 2-phase stepping motor. The invention may be equally applied to a stepping motor having any number of phases. For instance, the supply current control and discharge control performed on each coil current of a 5-phase stepping motor falls within the scope of the present invention.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A stepping motor drive device comprising:
   a pulse-width modulation control unit operable to pulse-width modulate a supply current from a power supply circuit to a coil that is included in a stepping motor, according to a reference signal showing a current limit value;
   a discharge instruction signal output unit operable to output a discharge instruction signal when the current limit value decreases; and
   a discharge control unit operable to cause a regenerative current from the coil to flow back into the power supply circuit during a time the discharge instruction signal is outputted.

2. The stepping motor drive device of claim 1, further comprising
   a bridge rectification circuit including a plurality of switching units, and operable to rectify a current through the coil, wherein
   the discharge control unit causes the regenerative current from the coil to flow back into the power supply circuit by putting each of the switching units individually in a predetermined state that is one of a conducting state and a non-conducting state.

3. The stepping motor drive device of claim 2, further comprising
   a synchronous rectification control unit operable to cause the regenerative current from the coil to circulate around the bridge rectification circuit by putting at least two of the switching units into the conducting state so as to form a closed circuit with the coil.

4. The stepping motor drive device of claim 1, wherein
   the discharge instruction signal output unit acquires a period-specifying signal that specifies a length of a discharge period, and outputs the discharge instruction signal for the specified discharge period starting when the current limit value decreases.

5. The stepping motor drive device of claim 1, further comprising:
   a coil current measurement unit operable to measure the regenerative current from the coil flowing back into the power supply circuit; and a comparison unit operable to compare the measured regenerative current with the current limit value, wherein the discharge instruction signal output unit outputs the discharge instruction signal for a duration starting when the current limit value decreases until the measured regenerative current falls below the decreased current limit value.

6. The stepping motor drive device of claim 5, further comprising a resistor connected in series with the coil and the power supply circuit, the regenerative current from the coil flowing back into the power supply circuit through the resistor, wherein the coil current measurement unit measures the regenerative current based on a voltage across the resistor.

7. The stepping motor drive device of claim 6, wherein the supply current from the power supply circuit to the coil, as well as the regenerative current, flows through the resistor, the coil current measurement unit measures the supply current to the coil based on a voltage across the resistor, and the pulse-width modulation control unit compares the measured supply current with the current limit value, and pulse-width modulates the supply current according to the comparison.

8. The stepping motor drive device according to claim 6, further comprising:

a bridge rectification circuit including a plurality of switching units, and operable to rectify a current through the coil, one of the switching units that is put into the conducting state being a first semiconductor element that serves as the resistor;

a reference current supply circuit operable to supply a current at the current limit value; and a second semiconductor circuit that is connected in series with the reference current supply circuit and is in the conducting state, wherein the comparison unit compares a first voltage across the first semiconductor element with a second voltage across the second semiconductor voltage, and the discharge instruction signal output unit outputs the discharge instruction signal for a duration until the second voltage falls below the first voltage.

9. The stepping motor driving device of claim 1, further comprising a digital signal reception unit operable to receive a digital signal showing the current limit value, wherein the stepping motor drive device acquires the reference signal by digital-to-analog converting the received digital signal.

10. The stepping motor drive device of claim 1, wherein the stepping motor includes a plurality of coils which correspond one-to-one with a plurality of phases, the pulse-width modulation control unit pulse-width modulates a supply current to each coil individually, according to a reference signal showing a current limit value for a corresponding coil, the discharge instruction output signal outputs a discharge instruction signal for each coil of which a current limit value decreases, and the discharge control signal causes, for a duration of the discharge instruction signal, a regenerative current from a corresponding coil to flow back into the power supply circuit.

11. A stepping motor drive method comprising:

a pulse-width modulation step of pulse-width modulating a supply current from a power supply circuit to a coil that is included in a stepping motor, according to a reference signal showing a current limit value;

a discharge instruction signal output step of outputting a discharge instruction signal when the current limit value decreases; and a discharge control step of causing a regenerative current from the coil to flow back into the power supply circuit during a time the discharge instruction signal is outputted.

* * * * *